United States Patent
Valentine et al.

(10) Patent No.: US 12,189,268 B2
(45) Date of Patent: Jan. 7, 2025

(54) DISPLAY SYSTEM WITH TUNABLE WAVELENGTH CONVERSION IN A NANOPHOTONIC PERIODICALLY POLED LITHIUM NIOBATE WAVEGUIDE

(71) Applicant: Meta Platforms Technologies, LLC, Menlo Park, CA (US)

(72) Inventors: Gareth John Valentine, Kirkland, WA (US); Zhimin Shi, Bellevue, WA (US); Xi Wu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 312 days.

(21) Appl. No.: 17/837,751

(22) Filed: Jun. 10, 2022

(65) Prior Publication Data

US 2023/0400748 A1    Dec. 14, 2023

(51) Int. Cl.
| | |
|---|---|
| *G02F 1/35* | (2006.01) |
| *G02B 6/12* | (2006.01) |
| *G02B 27/01* | (2006.01) |
| *G02F 1/39* | (2006.01) |
| *B82Y 20/00* | (2011.01) |
| *G02F 1/355* | (2006.01) |

(52) U.S. Cl.
CPC ....... *G02F 1/3546* (2021.01); *G02B 6/12009* (2013.01); *G02B 27/0172* (2013.01); *G02F 1/395* (2013.01); *B82Y 20/00* (2013.01); *G02B 2006/1204* (2013.01); *G02B 2207/101* (2013.01); *G02F 1/3558* (2013.01)

(58) Field of Classification Search
None
See application file for complete search history.

(56) References Cited

U.S. PATENT DOCUMENTS

| | | | | |
|---|---|---|---|---|
| 2001/0055453 | A1* | 12/2001 | Mizuuchi | G02F 1/3775 359/332 |
| 2003/0174920 | A1* | 9/2003 | Kawano | G02F 1/225 385/40 |
| 2007/0297732 | A1* | 12/2007 | Mason | G02B 6/12004 385/122 |

(Continued)

OTHER PUBLICATIONS

Cao., X.F., "Electro-optic Tuning and Modulation of Second Harmonic Generation in Quasi-Phase Matched LiNbO3 Waveguides," Integrated Photonics Research, 1993, vol. 10, pp. 463-466.

(Continued)

*Primary Examiner* — Jerry Rahll
(74) *Attorney, Agent, or Firm* — Mannava & Kang, P.C.

(57) ABSTRACT

According to examples, a tunable visible light source may include a periodically poled lithium niobate (PPLN) waveguide and a control mechanism to optimize the phase-matching of the PPLN waveguide in response to an input signal with a varied wavelength. The control mechanism may include an electro-optic (EO) tuning mechanism, a microheater-based thermo-optic (TO) control mechanism, and/or an acousto-optic (AO) control mechanism. The control mechanisms may, respectively, generate an electric field, heat, or an acoustic wave to affect a change in refractive index of the PPLN waveguide and thereby optimize the conversion efficiency to maximize the output power of the output wavelength of the PPLN waveguide as the input wavelength is tuned.

20 Claims, 19 Drawing Sheets

(56) References Cited

U.S. PATENT DOCUMENTS

| | | | | |
|---|---|---|---|---|
| 2009/0231679 | A1* | 9/2009 | Yoshino | G02F 1/3558 359/328 |
| 2012/0318983 | A1* | 12/2012 | Ouchi | G02F 1/3544 385/2 |
| 2014/0004638 | A1* | 1/2014 | Rabiei | G02B 6/136 438/31 |
| 2022/0107547 | A1* | 4/2022 | Yap | G02F 1/377 |
| 2022/0187681 | A1* | 6/2022 | Valentine | H01S 5/1092 |

OTHER PUBLICATIONS

Chen J.Y., et al., "Efficient and Highly Tunable Second-Harmonic Generation in Z-Cut Periodically Poled Lithium Niobate Nanowaveguides," Optics Letters, Apr. 5, 2020, vol. 45, No. 13, 5 pages.

Généreux F., et al., "Low-Voltage Tunable Second-Harmonic Generation in an X-Cut Periodically Poled Lithium Niobate Waveguide," Optics Letters, May 1, 2007, vol. 32, No. 9, pp. 1108-1110.

Luo R., et al., "Highly Tunable Efficient Second-Harmonic Generation in a Lithium Niobate Nanophotonic Waveguide," Optica, Aug. 16, 2018, vol. 5, No. 8, pp. 1006-1011.

Sayem A.A., et al., "Efficient and Tunable Blue Light Generation Using Lithium Niobate Nonlinear Photonics," Applied Physics Letters, Jul. 2, 2021, vol. 119, No. 23, 5 pages.

Wang C., et al., "Integrated Lithium Niobate Electro-Optic Modulators Operating at CMOS-Compatible Voltages," Nature, vol. 562, Sep. 24, 2018, pp. 101-104.

Wu X., et al., "High-Q Microresonators Integrated with Microheaters on a 3C-SiC-on-Insulator Platform," Optics Letters, Oct. 3, 2019, vol. 44, No. 20, 6 pages.

Yu Z.Y., et al., "Acousto-Optic Tunable Second Harmonic Generation in Periodically Poled LiNbO3," Optics Express, Jul. 6, 2009, vol. 17, No. 14, pp. 11965-11971.

* cited by examiner

DISPLAY SYSTEM WITH TUNABLE WAVELENGTH CONVERSION IN A NANOPHOTONIC PERIODICALLY POLED LITHIUM NIOBATE WAVEGUIDE

TECHNICAL FIELD

This patent application relates generally to light sources for display systems, and more specifically, to display systems with tunable wavelength conversion in a nanophotonic periodically poled lithium niobate (PPLN) waveguide.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted device (HMD), such as a wearable headset, wearable eyewear, or other display system. However, as these and other display systems continue to advance, improved opto-electronic components may be needed to provide quality images and optimum performance.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
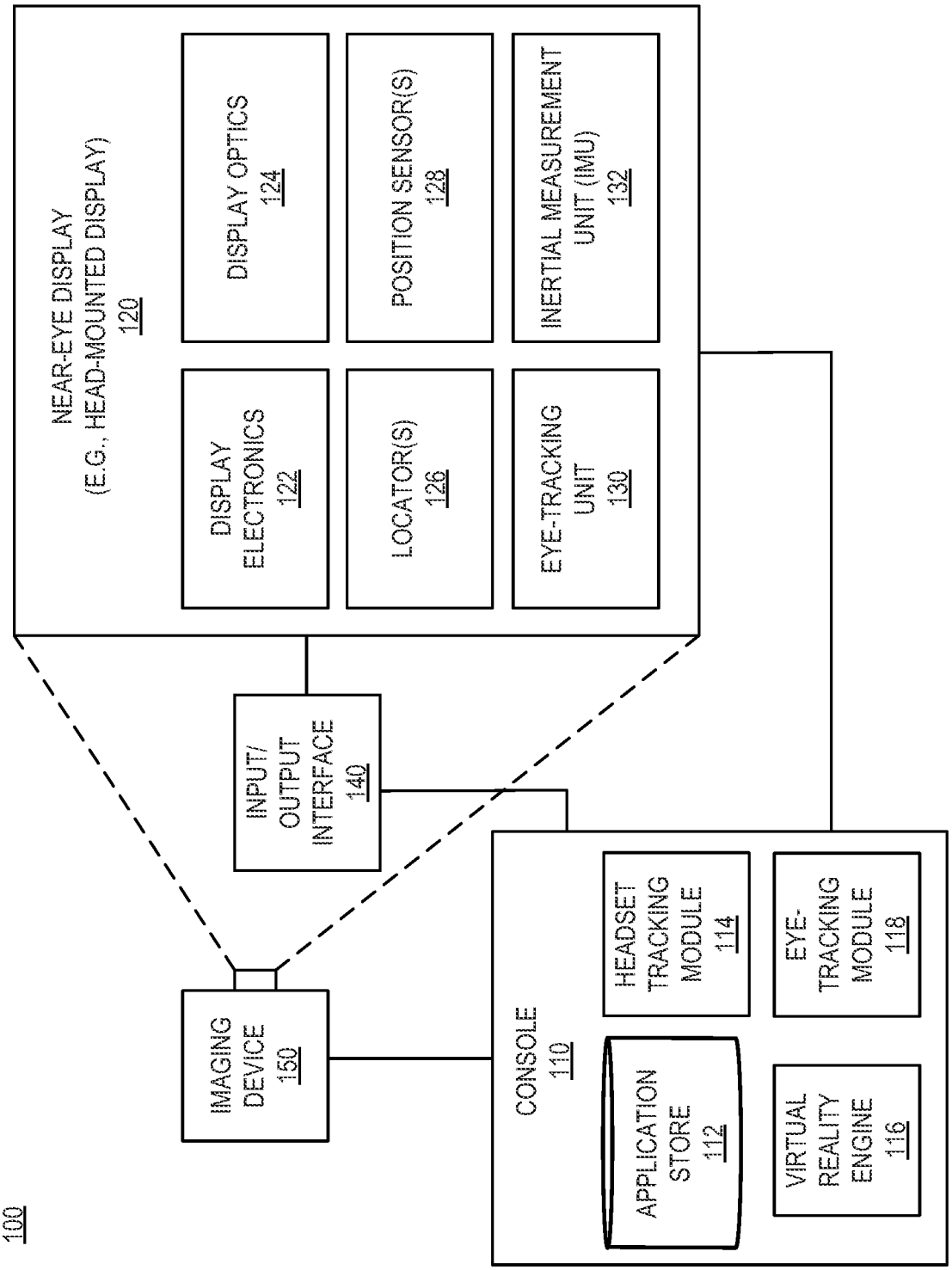
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As used herein, "NiCr" refers to Nichrome, an alloy of nickel and chromium with high resistivity used for fabricating wirewound resistors and electrical heaters; "LN" refers to lithium niobate, a salt consisting of niobium, lithium, and oxygen; "LNOI" refers to lithium niobate on insulator, a thin layer (~400 nm) of LN on a thin layer of $SiO_2$ on a silicon wafer; "PPLN" refers to periodically poled lithium niobate; "SHG" refers to second harmonic generation, a nonlinear frequency conversion process; "SFG" refers to sum frequency generation, another nonlinear frequency conversion process; "DFG" refers to difference frequency generation, a further nonlinear frequency conversion process; "PIC" refers to photonic integrated circuit; "GVD" refers to group velocity dispersion, a characteristic of a dispersive medium commonly used to determine how a medium may affect duration of an optical pulse traveling through the medium; "ITO" refers to Indium Tin Oxide; "TCO" refers to transparent conductive oxide; "EO effect" also called "Pockels effect" refers to changes in refractive index of an optical medium based on an applied electric field; and "GVM" refers to group velocity mismatch, a phenomenon where pulses may become temporally separated in a medium due to different group velocities. The phenomenon that the group velocity of light in a transparent medium depends on the optical frequency or wavelength is defined as a derivative of the inverse group velocity with respect to the angular frequency (or wavelength). GVM is quantitatively defined as the difference of the inverse group velocities.

Some display systems, such as virtual reality (VR), augmented reality (AR), and/or mixed reality (MR) based display systems, may employ one or more light sources and any number of optical components (e.g., gratings, reflectors, waveguides, etc.) to propagate light associated with an image from a projector to an eyebox. Next generation virtual reality (VR), augmented reality (AR), and/or mixed reality (MR) based display system or other display systems may rely on ever-improving high quality images in order to enhance a user's experience. Poor visual acuity may cause significant visual discomfort, which often results in dizziness, eye fatigue, or other side effects.

In order to realize the control of emission wavelength for next-generation virtual reality (VR), augmented reality (AR), and/or mixed reality (MR) based display systems, compact and efficient visible laser sources with narrow emission linewidth and high-speed tunability may be desirable. In some examples, in order to provide a tunable visible laser, native visible emitting semiconductor materials may be used. However, there may be a variety of technical challenges and risks associated with use of such materials, especially in terms of low gain and/or spectral bandwidth that result from properties of these materials. Thus, an alternative approach to resolve some of these challenges may be to use novel nonlinear frequency conversion technologies, together with the existing tunable near-infrared lasers, in order to convert the wavelengths from near-infrared to visible, as described herein.

Lithium niobate (LN or $LiNbO_3$), for example, is a salt consisting of niobium, lithium, and oxygen, and may be an important material for optical waveguides, mobile phones, piezoelectric sensors, optical modulators, and various other linear and non-linear optical applications. In some scenarios, lithium niobate (LN) may provide particular linear and nonlinear optical properties and may be used for nonlinear frequency conversion, such as second-harmonic generation (SHG), sum-frequency generation (SFG), and/or difference-frequency generation (DFG). Specifically, periodically poled lithium niobate (PPLN) nanowaveguides may have particular usefulness here. For instance, periodically poled lithium niobate (PPLN) may be a highly efficient medium for nonlinear wavelength conversion processes. When used for periodic domain inversion in PPLN, periodically poled lithium niobate (PPLN) nanowaveguides, for instance, may allow for a quasi-phase-matched frequency-conversion process.

In general, bandwidth for efficient quasi-phase-matching may be relatively small and/or may not allow efficient conversion to be maintained as input wavelength is rapidly tuned to new wavelengths. Thus, the systems and methods described herein may provide electro-optic (EO), thermo-optic (TO), and/or acousto-optic (AO) tuning for a nanophotonic periodically poled lithium niobate (PPLN) waveguide so that phase-matching may be maintained.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIGS. 2 and 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (I M U) 132, internal to the inertial measurement unit (I M U) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, an virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optical console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
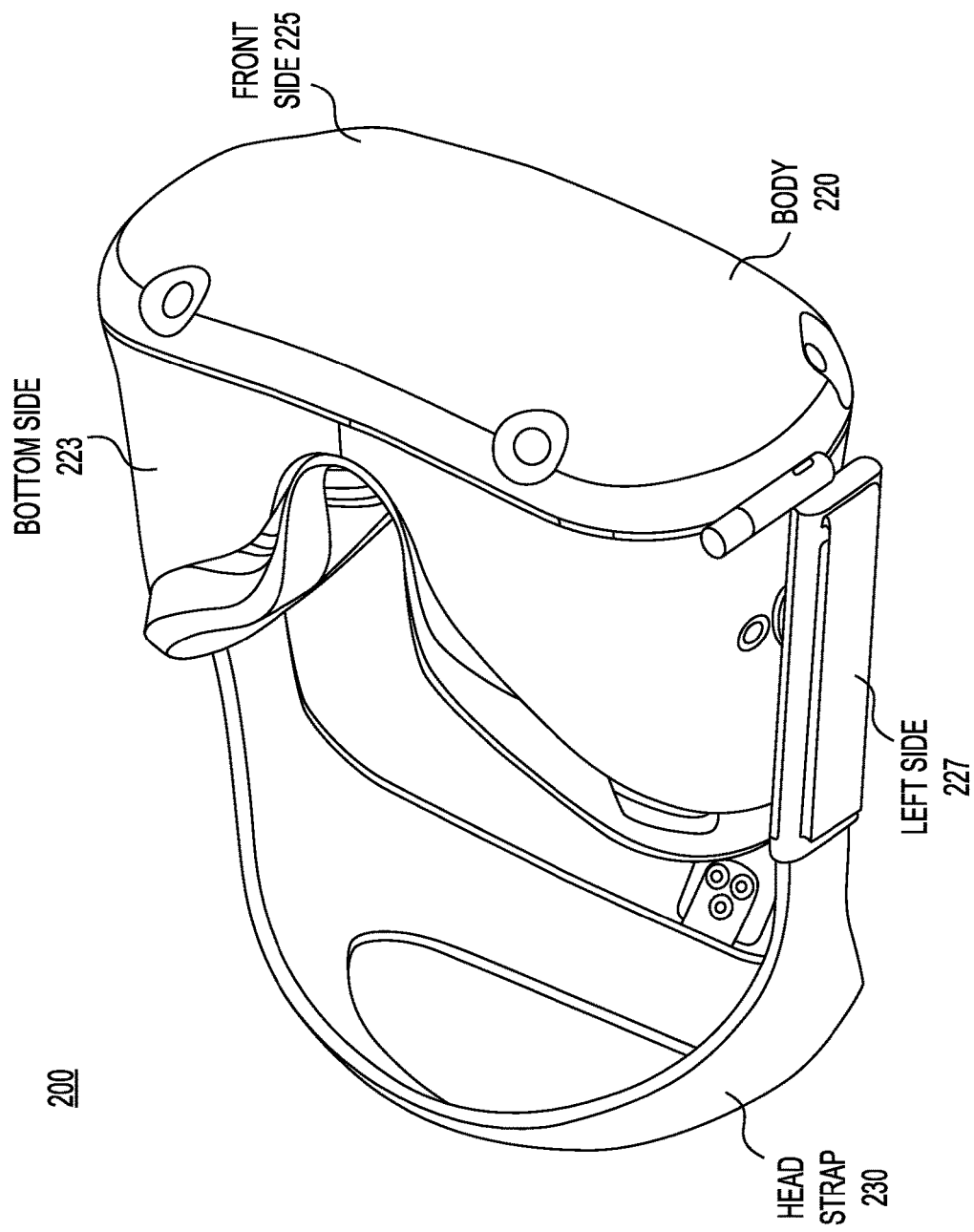
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
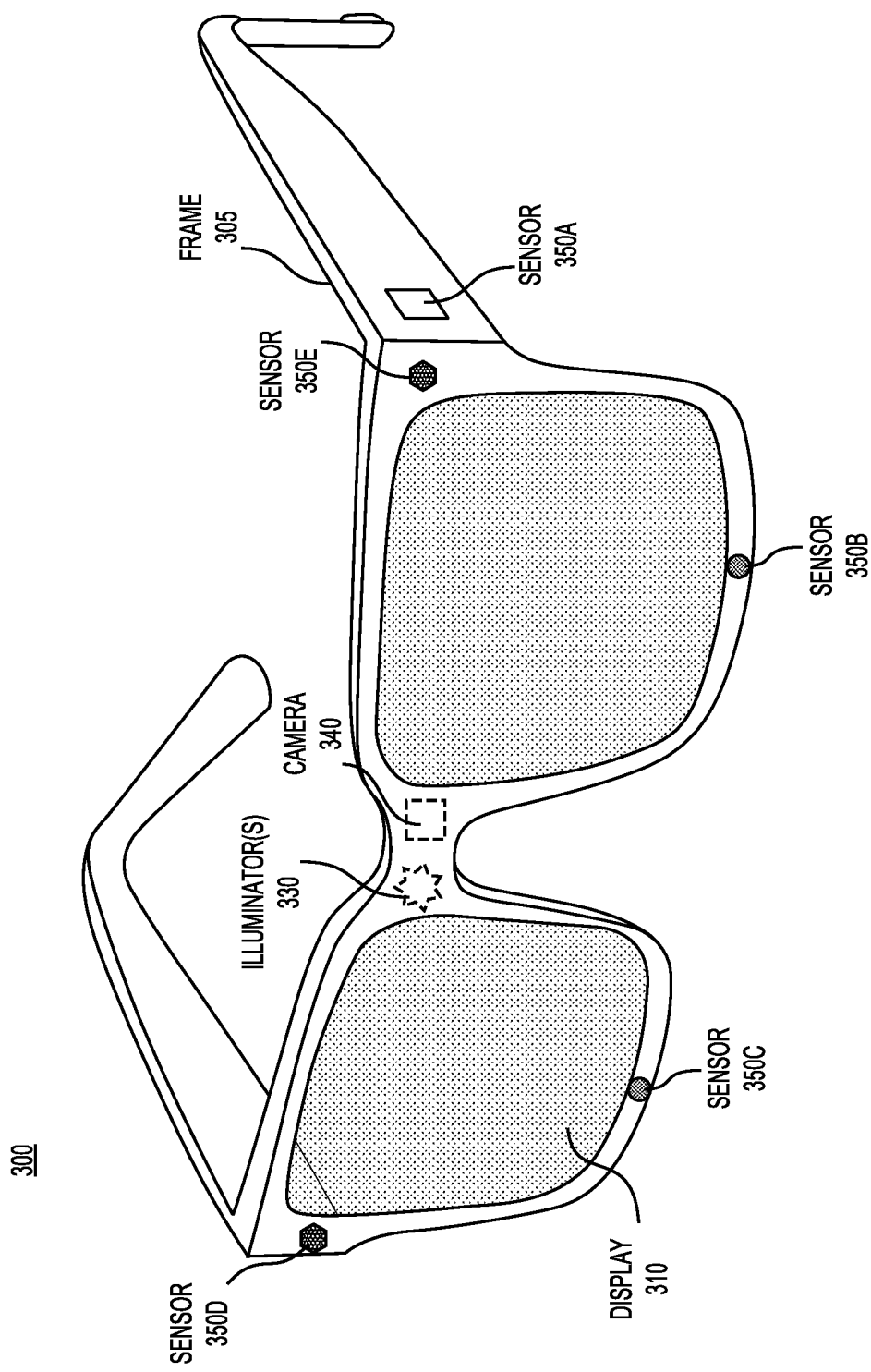
FIG. 3 is a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific implementation of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

As described above, next generation virtual reality (VR), augmented reality (AR), and/or mixed reality (MR) based display system or other display systems may rely on ever-improving high quality images in order to enhance a user's experience. Poor visual acuity may cause significant visual discomfort, which often results in dizziness, eye fatigue, or other side effects. As a result, compact and efficient visible laser sources with narrow emission linewidth and high-speed tunability may be used to provide control of emission wavelength for next-generation virtual reality (VR), augmented reality (AR), and/or mixed reality (MR) based display systems.

Because lithium niobate (LN or $LiNbO_3$), for example, may provide desirable linear and nonlinear optical properties, especially for nonlinear frequency conversion, such as second-harmonic generation (SHG), sum-frequency generation (SFG), and/or difference-frequency generation (DFG), periodically poled lithium niobate (PPLN) nanowaveguides may have particular usefulness for virtual reality (VR), augmented reality (AR), and/or mixed reality (MR) based display systems. As described herein, periodically poled lithium niobate (PPLN) may be a highly efficient medium for nonlinear wavelength conversion processes. When used for periodic domain inversion in PPLN, periodically poled lithium niobate (PPLN) nanowaveguides, for instance, may allow for a quasi-phase-matched frequency-conversion process.

Notably, the systems and methods described herein may provide electro-optic (EO), thermo-optic (TO), and/or acousto-optic (AO) tuning of a nanophotonic periodically poled lithium niobate (PPLN) waveguide so that phase-matching may be maintained.

Figure 4A:
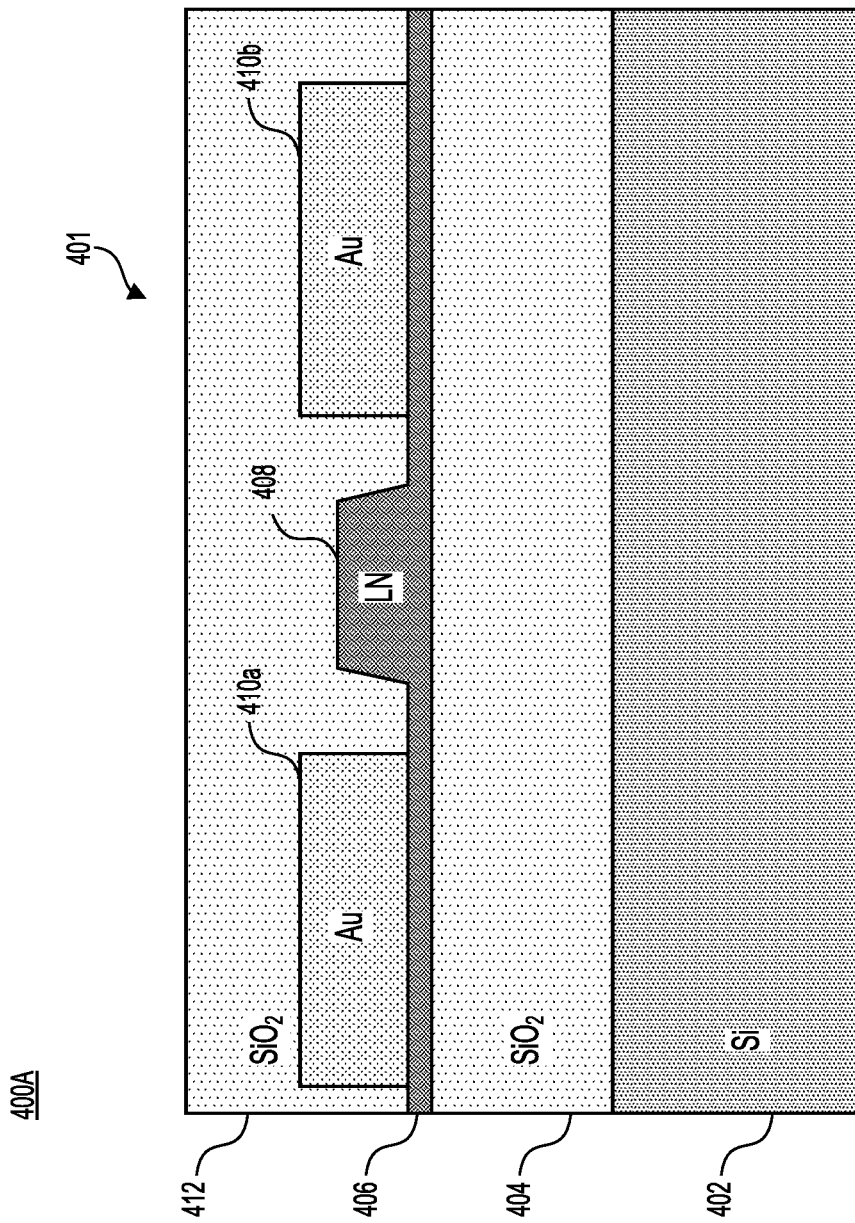
FIGS. 4A-4B illustrate cross-sectional and top views for electro-optic (EO) tuning of a periodically poled lithium niobate (PPLN) waveguide, according to an example.
Figure 4B:
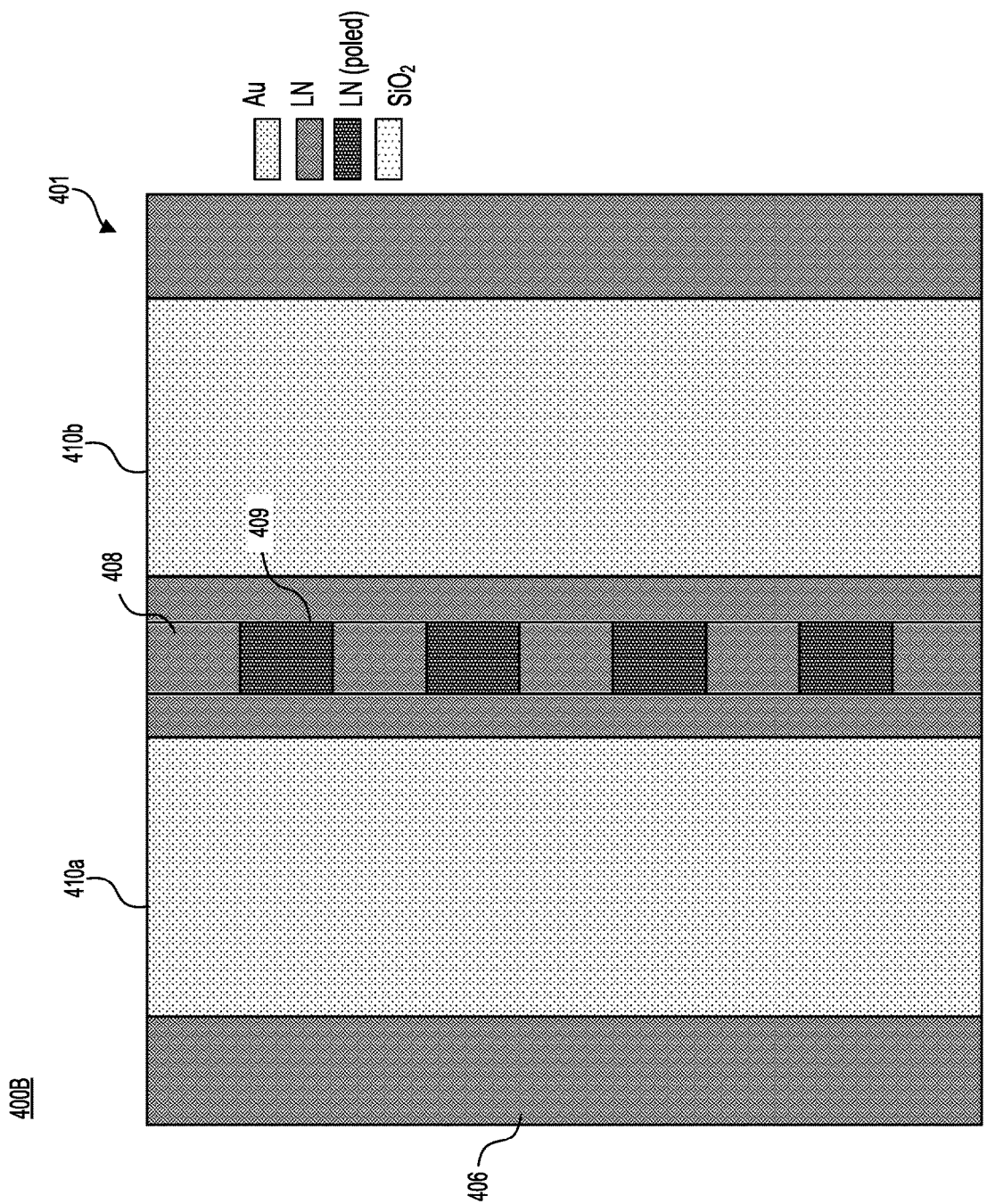

FIGS. 4A-4B illustrate views 400A-400B for electro-optic (EO) tuning of a periodically poled lithium niobate (PPLN) waveguide, according to an example. As diagram 400A in FIG. 4A shows, the periodically poled lithium niobate (PPLN) waveguide device 401 may include a first layer 402, a second layer 404, and third layer 406, and a fourth layer 412. The first layer 402 may be a lower silicon (Si) layer. The second layer 404 may be a silicon oxide ($SiO_2$) layer. The third layer 406 may be a lithium niobate (LN) layer. As shown, the LN layer may include the periodically poled lithium niobate (PPLN) waveguide 408, which in some examples, may be formed as a LN protrusion on the LN layer (e.g., third layer 406) that is periodically poled (see also in FIG. 4B). The LN protrusion may be formed by etching a ridge into the LN layer after patterning, e.g., by electron-beam lithography or photolithography. Electrodes 410a and 410b may be layered on the third layer 406. In some examples, the electrodes 410a and 410b may be gold (Au) electrodes. The fourth layer 412 may be an upper silicon oxide ($SiO_2$) layer deposited over the third layer 406, the periodically poled lithium niobate (PPLN) waveguide 408, and the electrodes 410a and 410b.

FIG. 4B illustrates a top view for electro-optic (EO) tuning of a periodically poled lithium niobate (PPLN) waveguide, according to an example. In diagram 400B, the periodically poled lithium niobate (PPLN) waveguide device 401 may include the first layer 402 (not shown), the second layer 404 (not shown), the third layer 406, and the fourth layer 412 (not shown). As shown, the third layer 406 may be a lithium niobate (LN) layer having the periodically poled lithium niobate (PPLN) waveguide 408 formed as a protrusion on the third layer 406. The electrodes 410a and 410b (e.g., gold (Au) electrodes) may be layered on the third layer 406 and positioned adjacent to the periodically poled lithium niobate (PPLN) waveguide 408.

Periodically poled lithium niobate (PPLN) is an engineered, quasi-phase-matched material. The term engineered refers to the fact that the orientation of the lithium niobate crystals may be periodically inverted ("poled"). The inverted portions of the crystals may yield generated photons that are 180° out of phase with generated photons that may have been created at that point in a crystal if it had not been poled. By selecting a particular periodicity with which to invert the orientation of the crystal, the newly generated photons may interfere constructively with previously generated photons, and as a result, a number of generated photons may grow as the light propagates through the periodically poled lithium niobate (PPLN), yielding a high conversion efficiency of input to generated photons.

As described herein, Lithium niobate (LN) may provide particular linear and nonlinear optical properties and may be used for nonlinear frequency conversion, such as second-harmonic generation (SHG), sum-frequency generation (SFG), and difference-frequency generation (DFG). Specifically, periodically poled lithium niobate (PPLN) nanowaveguides may allow for quasi-phase-matched frequency-conversion process. While a bandwidth for efficient quasi-phase-matching may be small and may not allow efficient conversion to be maintained as the input wavelength is rapidly tuned to new wavelengths, phase-matching may be maintained, in some examples, by applying an electric field across the PPLN nanowaveguide. Thus, strong electro-optic coefficients of lithium niobate may be exploited to bring about a change in the material refractive index. Phase-matching may thus be rapidly tracked as the input wavelength is varied by modulating the applied electric field.

In some examples, the configuration shown in diagrams 400A and 400B may be referred to as a Z-cut nanophotonic periodically poled lithium niobate (PPLN) waveguide with gold (Au) electrodes. The modes with main electric field component along an ordinary axis may be used to avoid cancellation of the mode index EO modulation because the waveguide is periodically poled along the extraordinary axis. Thus, for a Z-cut waveguide, where the e-axis is perpendicular to a chip surface, the electric field may be applied horizontally (along the chip surface direction) by the electrodes 410a and 410b, and TE mode to TE mode conversion may be used. X-cut configuration waveguides may also be implemented using TM input mode.

In some examples, the modulated electric field (EO modulation) may be provided through the electrodes (e.g., gold) 410a and 410b affecting the refractive index of lithium niobate (third layer 406 and the periodically poled lithium niobate (PPLN) waveguide 408) to create a change in the resulting operation wavelength/frequency. Thus, phase-matching may be rapidly tracked as the input wavelength is varied by the modulated electric field.

Figure 5A:
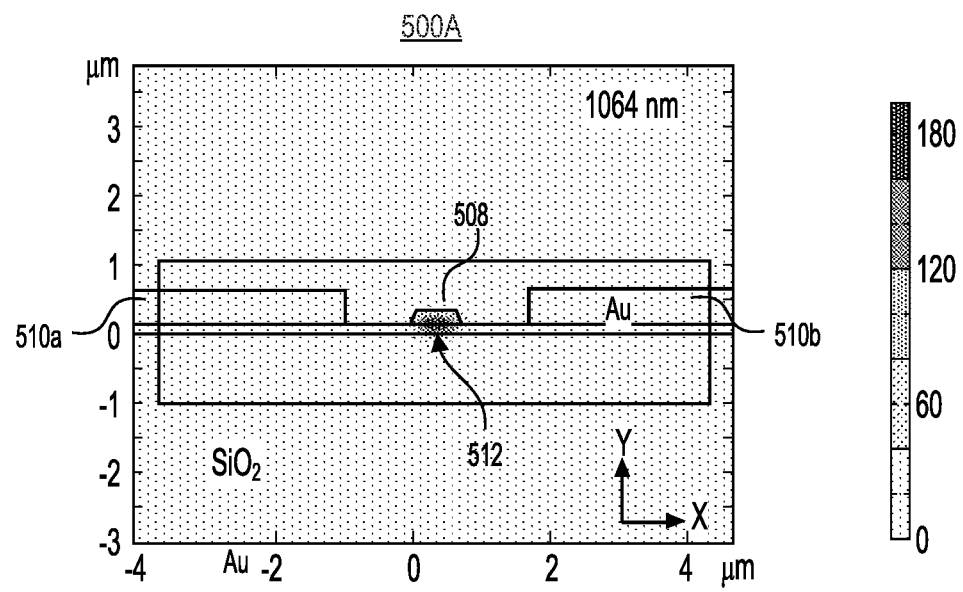
FIGS. 5A-5B illustrate cross-sectional views of optical field distributions for electro-optic (EO) tuning of a periodically poled lithium niobate (PPLN) waveguide, according to an example.
Figure 5B:
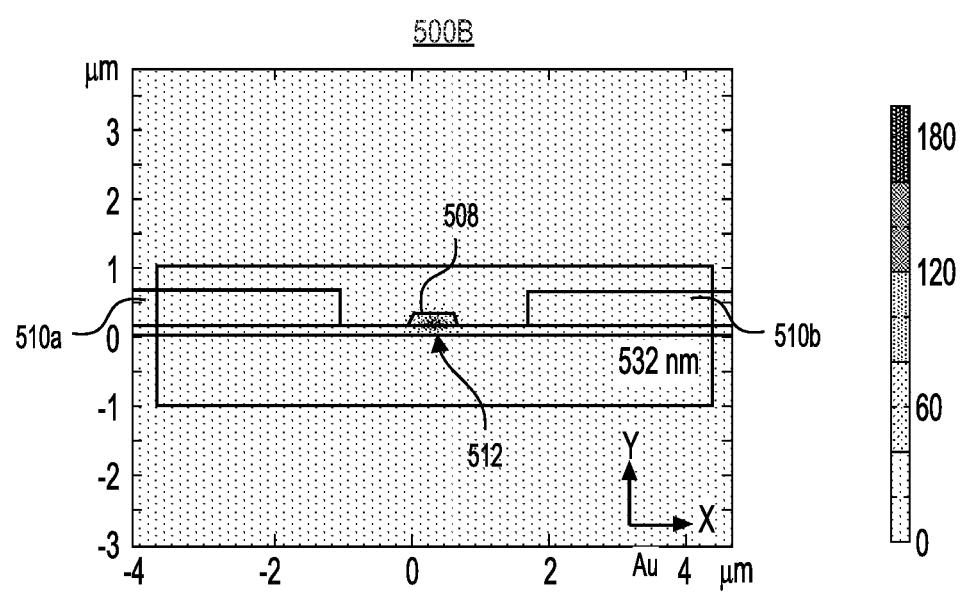

FIGS. 5A-5B illustrate cross-sectional views of optical field distributions for electro-optic (EO) tuning of a periodically poled lithium niobate (PPLN) waveguide, according to an example. More specifically, diagrams 500A and 500B in FIGS. 5A-5B illustrate numerically simulated optical field distributions 512 (in $E_x$) in the cross-section of the waveguide-electrode configuration of FIGS. 4A-4B. In one implementation example, the electrode spacing (e.g., spacing between respective electrodes 510a, 510b and the waveguide 508) may be 1 µm, the top width of the Z-cut nanophotonic PPLN waveguide may be 600 nm, the etch depth may be 150 nm, and the total LN thickness may be 300 nm. Also, the sidewall angle may be 75° and the thickness of the Au electrode may be 500 nm. As shown, an electro-optic (EO) tunability of around 147.7 pm/V with $TE_{20}$ (1064 nm) to TE N) (532 nm) mode conversion may be achieved. In some examples, higher order spatial modes for the fundamental IR wavelength may be used to convert to fundamental spatial modes for the second-harmonic generation (SHG), sum-frequency generation (SFG) visible wavelengths and to minimize group velocity mismatch (GVM).

It should be appreciated that the structural parameters of this device may also include the following: top width=1200 nm; etch depth=317 nm; LN thickness=400 nm; and angle=75°. It should be appreciated that preferred structural parameters of the nanophotonic PPLN waveguides may also be listed as follows: (1) LN thickness: 300 nm-700 nm [100-1000 nm]; (2) sidewall angle: 65°-80° [30 deg-90 deg]; (3) top width of the waveguide: 400 nm-1200 nm; and (4) etching depth of the waveguide [10%-90% of the LN thin film thickness]. Other various sizes, dimensions, and/or parameters may also be provided.

Figure 5C:
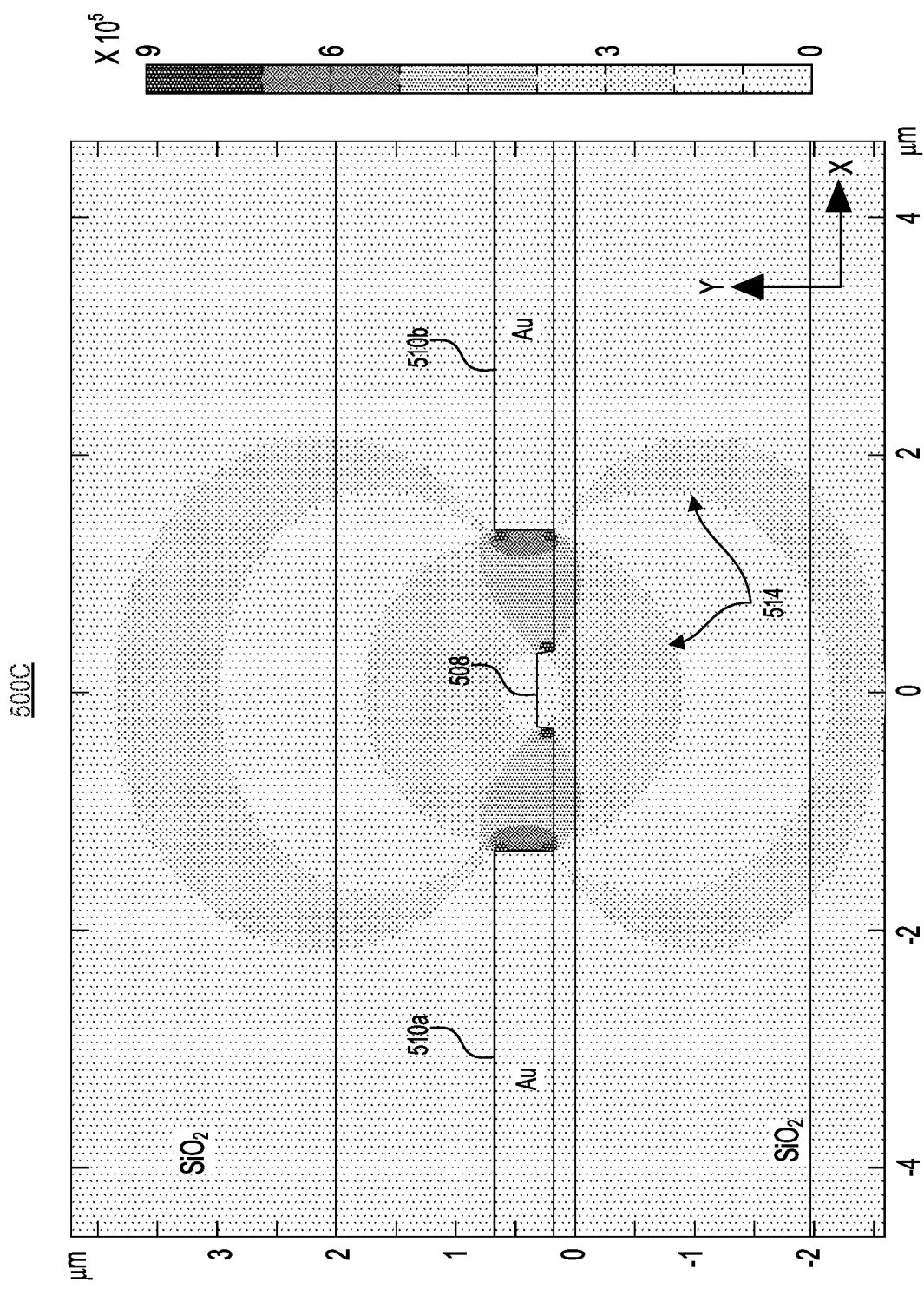
FIG. 5C illustrates applied external electric field distribution in the periodically poled lithium niobate (PPLN) waveguide for electro-optic (EO) tuning, according to an example.

FIG. 5C illustrates applied external electric field distribution in the periodically poled lithium niobate (PPLN) waveguide for electro-optic (EO) tuning, according to an example. Diagram 500C shows numerically simulated electric field distributions 514 (shown in $E_x$) in the cross-section of the waveguide-electrode configuration of FIGS. 4A-4B, when a voltage of 1V is applied across the two electrodes 510a and 510b.

Table 1, as shown below for example, may provide optical loss of PPLN waveguide structure with highest electro-optic (EO) tunability. For example, the preferred electrode spacing for higher-order modes of different nanophotonic PPLN waveguide structures may in the range of 1.2 µm-2.0 µm. It should be noted that optical loss caused by the metal for the wavelength of 532 nm may be very small compared with that for 1064 nm, so the results in between the range are not shown. Specifically, Table 1 illustrates optical loss with different electrode spacings for $TE_{20}$ at 1064 nm and $TE_{00}$ at 532 nm.

TABLE 1

| Electrode Spacing (µm) | 1064 nm Optical loss (dB/cm): $TE_{20}$ | 532 nm Optical loss (dB/cm): $TE_{00}$ |
| --- | --- | --- |
| 1.0 | 13.40 | $4.21 \times 10^{-11}$ |
| 1.1 | 6.809 | / |
| 1.2 | 3.345 | / |
| 1.4 | $8.216 \times 10^{-2}$ | / |
| 1.6 | $2.076 \times 10^{-2}$ | / |
| 2.0 | $1.370 \times 10^{-2}$ | $1.80 \times 10^{-2}$ |

The systems and methods described herein may provide electro-optic (EO) tuning for a nanophotonic periodically poled lithium niobate (PPLN) waveguide so that phase-matching may be maintained. There may be any number of ways this may be achieved.

In some examples, COMSOL Electrostatics may be utilized to model the generated electric field. The structural parameters of the Au electrodes and the spacing between the electrode and the waveguide may also be optimized to avoid optical loss while achieving an efficient electric field to the periodically poled lithium niobate (PPLN) waveguide.

In some examples, a finite-difference eigenmode (FDE), implemented using a photonic simulation (e.g., Lumerical®) may be used to model the mode properties and nonlinear frequency conversion performance of periodically poled lithium niobate (PPLN) waveguides. Any number of modes with main electric field component along the ordinary axis may be used in the systems and methods described herein to avoid cancellation of the mode index electro-optic (EO) modulation because the waveguide may be periodically poled along the extraordinary axis. As mentioned herein, for a Z-cut waveguide, the electric field may be applied horizontally (along the chip surface direction), and TE mode to TE mode conversion may be used.

In some examples, a frequency conversion between fundamental modes and a frequency conversion between higher-order modes (i.e., $TE_{10}$ or $TE_{20}$) and fundamental modes may be used in green wavelength (1064/532 nm).

Accordingly, electro-optic (EO) tunability may be achieved in a range from 22.1 to 147.7 μm/V.

As described herein, electro-optic (EO) tuning effect, for example, may be optimized in structures having low group velocity mismatch (GVM) between the fundamental and converted (second harmonic generation "SHG") visible light and having a strong DC electric field strength within the periodically poled lithium niobate on insulator (PPLNOI) waveguide. In some instances, the former may be accessible by using higher order guided spatial modes for the tuned infrared input signal and the latter by placing the electrodes in close proximity to the waveguide and using materials having higher relative permittivity for cladding ($SiO_2$). The electrode proximity may be compromised by the optical loss introduced to the guided mode within the waveguide and the relative permittivity by the requirement to have a cladding with a lower refractive index than the lithium niobate.

In some examples, the electrodes may also be implemented with a periodicity (e.g., similar to that of the LN protrusions). The configuration of having periodical electrodes, as shown in the examples described herein, may also provide any number of advantages, such as preserving higher conversion efficiency and tunability. In other examples, second harmonic generation (SHG) may be considered but the techniques described herein may generally be applicable to sum frequency generation (SFG) and also difference frequency generation (DFG) configurations as well, where one or more of the input wavelengths may be varied and the optimum phase-matching condition of the nonlinear nanowaveguide may be tuned at high speed to track the varying input wavelengths.

Optimum operation wavelength of a periodically poled lithium niobate (PPLN) nanowaveguide to support second harmonic generation (SHG) may be varied by a linear electro-optic (EO) effect, also known as Pockels effect. Compared with other potential tuning mechanisms (e.g., free-carrier plasma dispersion effect and thermo-optic effect), the electro-optic (EO) effect may provide any number of benefits and advantages. These may include, but are not limited to, faster tuning speed and lower power consumption.

With regard to faster tuning speed (e.g., strong electro-optic (EO) effect in LN may lead to a near-instantaneous linear change of the refractive index in response to an applied voltage), the electro-optic (EO) effect itself may occur on a femtosecond timescale. However, initiating a change may require movement of electrical charge. This may therefore be affected by the design of the structure and especially the capacitance of the device and the inductance of the electrical contacts. Optimum design may allow tuning speeds of 100's MHz or more, if required, compared with maximum tuning speeds of kHz for thermo-optic based devices.

With regard to lower power consumption, the electro-optic (EO) effect may result from a change in the applied electric field only. The device may appear as a capacitor and hence retuning the device may involve a change in charge only. Unlike thermally tuned devices, which may generally require a constant power consumption to maintain a fixed tuning state, electro-optic (EO) tuned devices may not require any power except when being retuned. In this case, power consumption may be relatively small. In a practical example, for a 1 cm long×600 nm waveguide, the static capacitance may be approximately 2.7 pF. Tuning of such a device with a change in applied voltage of 100 V may therefore require only 14 nJ. Constant retuning on this scale at 10 kHz may need 140 uW. This may compare well with a thermo-optic microheater of a device of similar dimensions requiring 10's of mW to maintain a constant tuned state, also described herein.

Together with a thin-film lithium-niobate-on-insulator (LNOI) platforms, the systems and methods described herein may, in some examples, provide a fully integrated and compact EO-tunable frequency converter with high tunability and/or high tuning speed.

Electro-optic (EO) tuning of periodically poled lithium niobate (PPLN) waveguide operating in the near-infrared based on bulk lithium niobate (LN) platforms may not have traditionally been offered in an integrated approach. As a result, these conventional solutions may not have benefitted from the capabilities of a photonic integrated circuit (PIC) platform of compactness and high-mode confinement which leads to large nonlinear conversion efficiency, as provided and described herein. The wavelengths of converted light may have been in the infrared spectrum and/or the poling period may have been quite large. Thus, any restrictions that are unique to the shorter wavelength visible emission and nanophotonic platform may not have been considered.

The photonic integrated circuit (PIC) platform provided in the systems and methods described herein may also permit added functionality to be integrated within the same device as the electro-optic (EO) tuned nonlinear converter to include spatial mode converters, optical splitters/couplers and input/output gratings to simplify system integration. The superior optical mode confinement within a nanowaveguide on a photonic integrated circuit (PIC) device compared to bulk lithium niobate (PPLN) waveguides may allow for substantially stronger nonlinear optical effects to be accessed. This may provide efficient (e.g., >50%) nonlinear conversion from the near IR to the visible within a compact package at input power levels of ~10 s mW.

While the devices described herein are examples of one potential optimized structure for the considered particular cases, many other variations may also be implemented using the principles described herein. For example, the herein described wavelengths may be for second harmonic generation (SHG) or sum frequency generation (SFG) from tunable near-IR to tunable visible light. However, alternative implementations may operate from mid-IR to IR, visible to UV, or in longer wavelength of near-IR (e.g., from 1550 nm to 775 nm) using alternative materials.

Examples described herein assume a periodically poled lithium niobate (PPLN) waveguide fully encapsulated by a cladding material ($SiO_2$) (e.g., fourth layer 412 in FIG. 4A). Other examples may include partially or fully etched regions of the $SiO_2$ cladding to provide for enhanced mode confinement (using air cladding instead of $SiO_2$) or enhanced electric field distribution (using higher permittivity cladding materials).

As discussed herein, example configurations may provide a compromise between achieving low optical loss (low optical interaction with the metal electrodes) and high nonlinear conversion by maintaining a tightly confined optical mode (low index cladding material) and maximizing the electric field within the periodically poled lithium niobate (PPLN) waveguide (e.g., by locating the electrodes within a close proximity of the waveguide and using a cladding material with a high relative permittivity compared with lithium niobate "LN"). Lithium niobate (LN) has a relatively high relative permittivity (~40 cf. ~4 for $SiO_2$), which may result in a majority of the applied electric field being distributed within the $SiO_2$ cladding rather than the periodically poled lithium niobate (PPLN) waveguide. Alternative examples may utilize different materials in circumstances where this compromise may change. For example, known high K (dielectric constant/relative permittivity) material may be used for cladding such as $HfO_2$, where weaker mode confinement can be tolerated; or non-metal conductive materials may be used to apply the electric field in close proximity to the waveguide (such as using Indium Tin Oxide (ITO) electrodes instead of Au).

In some examples, the electro-optic (EO) control of the phase-matching condition may be achieved by modulating the material refractive index of a nonlinear waveguide for a number of different nonlinear phenomena in the photonic integrated circuit (PIC). For example, the electro-optic (EO) effect may be used to optimize other chi-2 effects including difference frequency generation (DFG) and devices based on an optical parametric effect (OPOs, OPA etc.) integrated on a photonic integrated circuit (PIC). Furthermore, a performance of nonlinear interactions may be optimized based on a chi-3 type effect such as four wave mixing (FWM) by maintaining optimum phase-matching through changing conditions.

Although the changing condition regarded herein for which the phase-matching is to be maintained is the tuning of the input wavelength, and the electro-optic (EO) effect is used to maintain optimum device efficiency as the wavelength varies, the electro-optic (EO) effect may also maintain phase-matching performance of nonlinear effects in a nonlinear waveguide of the photonic integrated circuit (PIC) as other conditions are changed, including environmental (e.g., temperature), or to compensate for fabrication variations between devices (e.g., poling period).

As mentioned herein, an additional or alternative approach to electro-optic (EO) tuning of PPLN waveguide may be thermo-optic tuning. Nonlinear conversion techniques may have narrow 'phase-matched' bandwidths over which efficient nonlinear conversion from the infrared (pump) to the visible (second harmonic generated) can occur. The exact wavelength at which efficient conversion occurs may be 'tuned' by varying a temperature of the waveguide. In some examples, using nanowaveguides fabricated on thin-film lithium niobate on insulator (LNOI) material within a photonic integrated circuit (PIC), nonlinear structures within which the nonlinear conversion occurs may be short with a small waveguide cross-section (e.g., 400× 500 nm).

Thermo-optic (TO) tuning of the integrated photonic devices may enable high-speed tunability and a relatively large tuning range to realize effective broadband nonlinear frequency conversion. An integrated microheater may provide a fully integrated chip-scale technique to realize thermo-optic (TO) tuning compared to approaches using a heater to heat the entire chip. Thus, a device that can be rapidly tuned to maintain efficient nonlinear conversion as the wavelength of an input signal is varied may be constructed, that is, an efficient, high-speed tunable device for second harmonic generation (SHG) or sum frequency generation (SFG) to generate tunable visible light over a broad range of wavelengths.

Figure 6A:
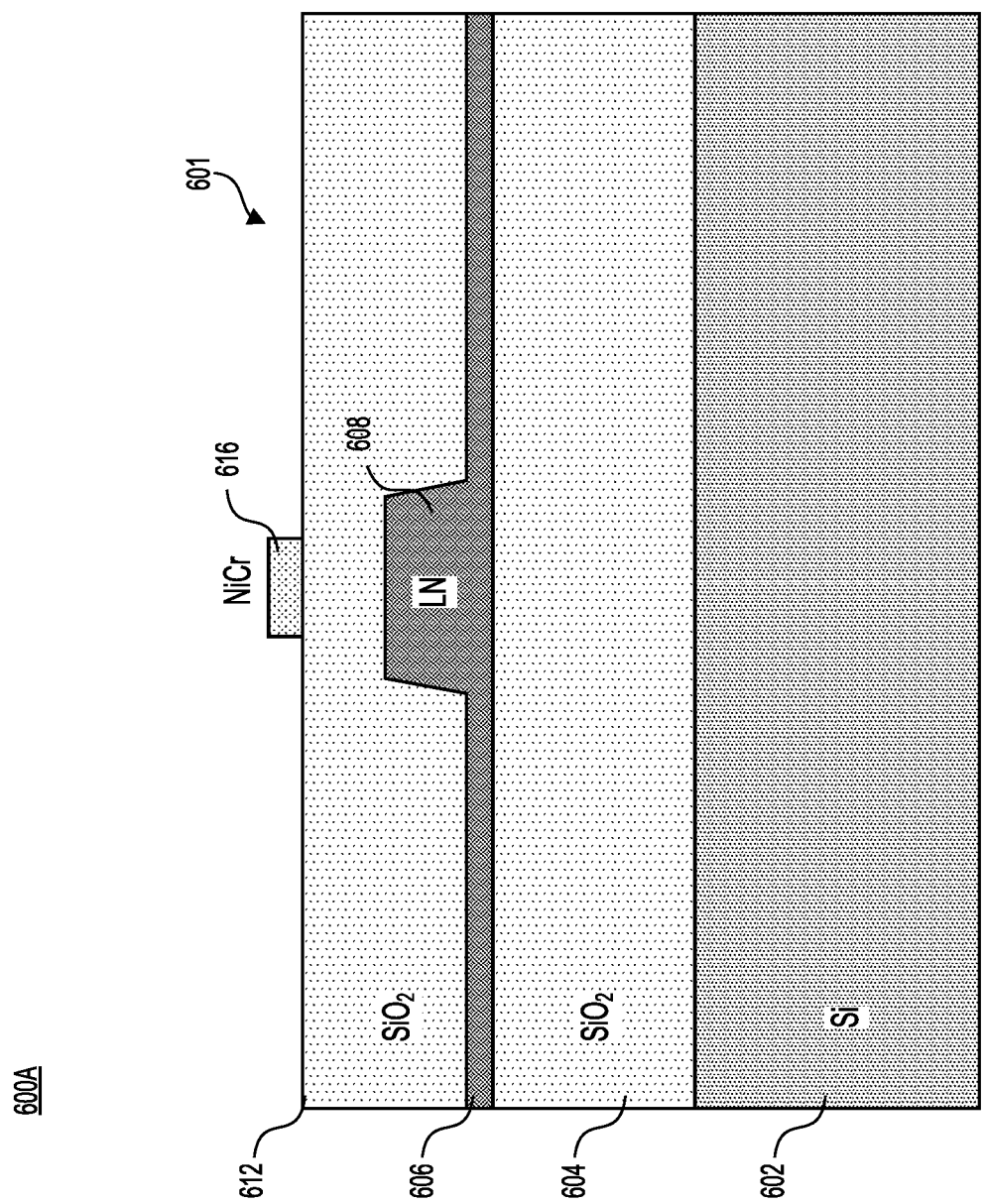
FIGS. 6A-6B illustrate cross-sectional and top views for thermo-optic (TO) tuning of a periodically poled lithium niobate (PPLN) waveguide, according to an example.
Figure 6B:
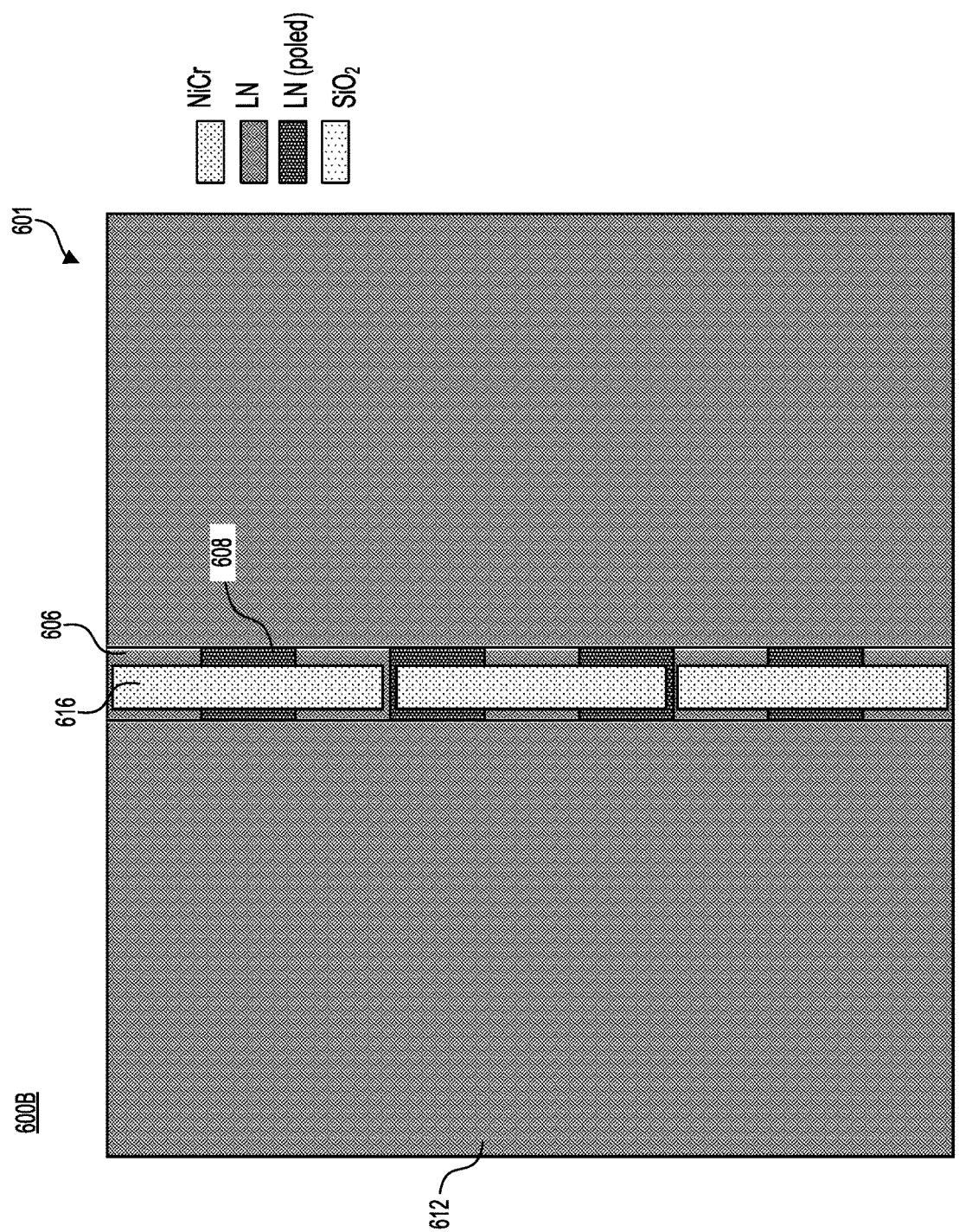

FIGS. 6A-6B illustrate cross-sectional and top views for thermo-optic (TO) tuning of a periodically poled lithium niobate (PPLN) waveguide, according to an example. Diagram 600A in FIG. 6A shows a cross-sectional view of a periodically poled lithium niobate (PPLN) waveguide device 601 that may be tuned through a thermo-optic (TO) effect, according to an example. The periodically poled lithium niobate (PPLN) waveguide device 601 may include a first layer 602, a second layer 604, and third layer 606, and a fourth layer 612. The first layer 602 may be a lower silicon (Si) layer. The second layer 604 may be a silicon oxide ($SiO_2$) layer. The third layer 606 may be a lithium niobate (LN) layer. As shown, the LN layer may include the periodically poled lithium niobate (PPLN) waveguide 608 that is formed as a protrusion on the third layer 606 and periodically poled (see also in FIG. 6B). The fourth layer 612 may be an upper silicon oxide ($SiO_2$) layer deposited over the third layer 606 and the periodically poled lithium niobate (PPLN) waveguide 608. Microheater 616 may be layered on the fourth layer 612 and made from Nichrome (NiCr), an alloy of nickel and chromium.

Diagram 600B in FIG. 6B shows a top view of a periodically poled lithium niobate (PPLN) waveguide device 601 that may be tuned through a thermo-optic (TO) effect, according to an example. The periodically poled lithium niobate (PPLN) waveguide device 601 is shown with fourth layer ($SiO_2$) 612, third layer (LN) 606 in a gap between the two portions of the fourth layer 612, and periodically poled lithium niobate (PPLN) waveguide 608. For the thermo-optic (TO) process, multiple microheaters 616 are shown placed over the periodically poled lithium niobate (PPLN) waveguide 608. As shown in diagram 600A, there may be a silicon oxide ($SiO_2$) layer between the microheaters 616 and the periodically poled lithium niobate (PPLN) waveguide 608.

Thermo-optically tunable nanophotonic periodically poled lithium niobate (PPLN) waveguides using a heater to heat the entire chip may increase of the temperature of the entire chip may affect performance of other integrated photonic devices on the chip and it is not a fully integrated chip-scale approach to realize the tunability. Example thermo-optically tuned nanophotonic periodically poled lithium niobate (PPLN) waveguides through on-chip microheaters may resolve those challenges as the microheater 616 is fully integrated and may introduce local temperature increases only. Indeed, as shown in diagram 600B, the microheater may be segmented to allow application of different currents and/or power (i.e., different local temperature increases) to different devices on the same chip. The microheater segments (or separate microheaters) may be substantially similar in size to ensure consistency in heat generation and control in some examples.

The advantages of the temperature tuning of the structures through integrated microheaters for efficient phase-matched conversion may potentially include: (1) a small input power requirement (e.g., 53.75 mW to achieve a 10.3 nm wavelength shift for $TE_{20}$-$TM_{00}$ conversion in green wavelengths, using a z-cut PPLN waveguide with 400 nm top width, 550 nm LN thickness and 1 mm length, and a NiCr microheater of 400 nm width and 100 nm thickness); (2) fast response time and modulation speed (e.g., a few to tens of microseconds); (3) highly localized temperature effects within a photonic integrated circuit (PIC). It should be appreciated that these features may generally be made possible if the heater on the photonic integrated circuit (PIC) is highly localized to the nonlinear conversion structure.

Figure 7:
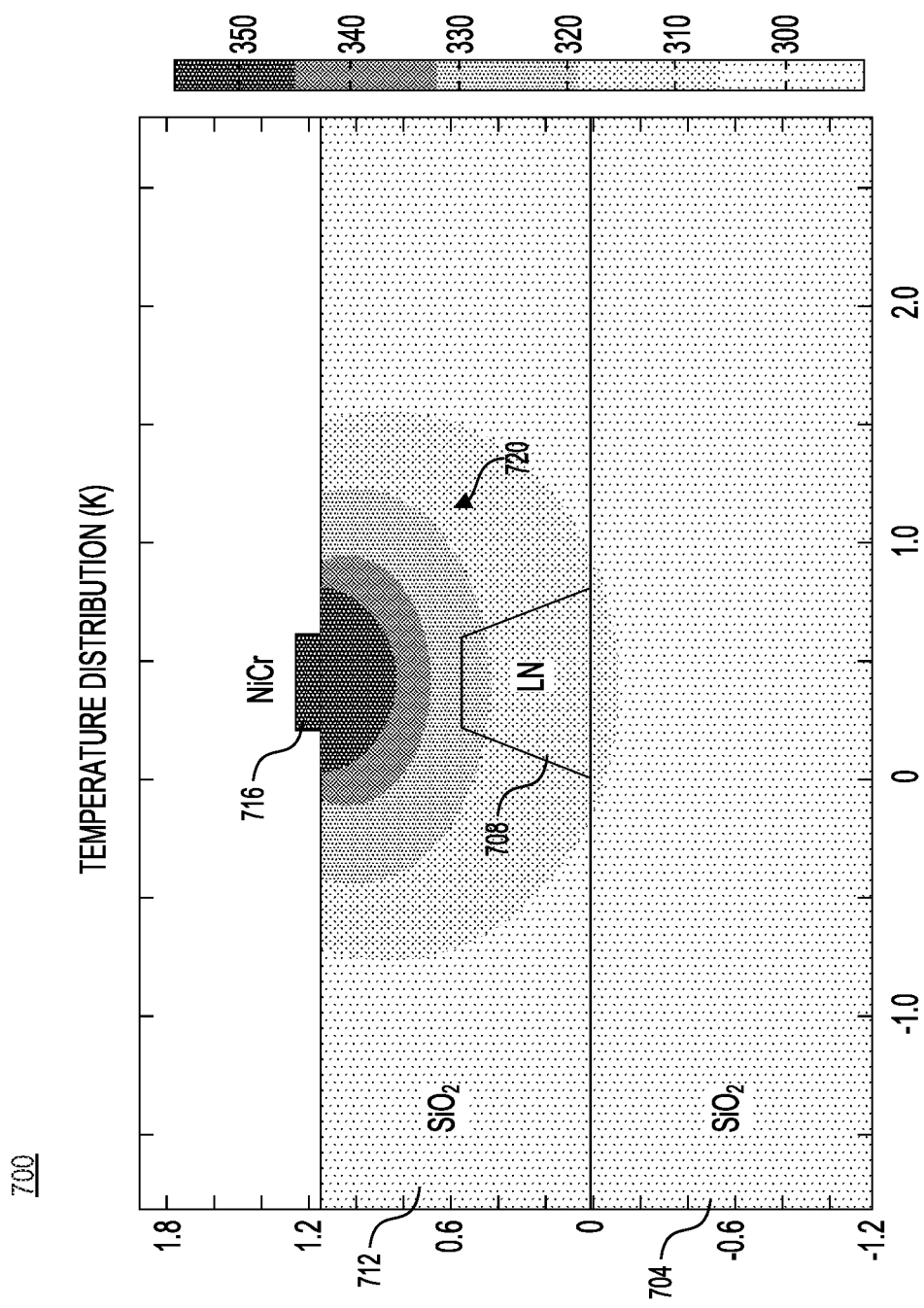
FIG. 7 illustrates a cross-sectional view of temperature distributions for thermo-optic (TO) tuning of a periodically poled lithium niobate (PPLN) waveguide, according to an example.

FIG. 7 illustrates a cross-sectional view of temperature distributions for thermo-optic (TO) tuning of a periodically poled lithium niobate (PPLN) waveguide, according to an example. As shown in diagram 700, a periodically poled lithium niobate (PPLN) waveguide 708 realized between two silicon oxide ($SiO_2$) layers 704 and 712, where silicon oxide ($SiO_2$) layer 712 may also be referred to as cladding because it covers the lithium niobate (LN) layer, may be locally heated for nonlinear conversion control by NiCr microheater 716. The temperature distribution 720 shows how the periodically poled lithium niobate (PPLN) waveguide 708 receives a bulk of temperature increase due to the close proximity of the NiCr microheater 716.

In some examples, the oxide cladding thickness (spacing between the top surface of the waveguide and the bottom surface of the microheater 716) may be about 0.6 μm in order to have efficient heat transfer while avoiding optical loss. A top width of the Z-cut PPLN waveguide (approximately 1 mm long) may be 400 nm, and the total LN layer thickness may be 550 nm. A sidewall angle may be 70°. In the illustrated practical example, an average device temperature may be increased by ~26.90 K when a 1 mA electric current is applied to the NiCr microheater 716 (example width: 400 nm, thickness: 100 nm, resistance: 53.75 kΩ), corresponding to a power of 53.75 mW. NiCr may be selected as the microheater material as it provides a relatively high resistivity ($2.15\times10^{(-6)}$ Ωm) compared to that of other materials (e.g., platinum with the resistivity of $1.1\times10^{(-7)}$ Ωm). However, depending on application, other materials may also be used for the microheater 716. For example, other alloys having high resistivity such as constantan or manganin may be used to substitute NiCr. In some implementations, pure metals such as platinum may also be used.

In some examples, preferred structural parameters for the periodically poled lithium niobate (PPLN) waveguide 708 may include, but are not limited to, LN thickness: 400 nm-700 nm; sidewall angle: 65°-80°; top width of the waveguide: 400 nm-1200 nm. Preferred structural parameters of the NiCr microheater may include, but are not limited to, thickness: 100 nm-150 nm; and width: 400 nm-600 nm.

In FIGS. 8A-9C below, additional and alternative features for thermo-optically tunable periodically poled lithium niobate (PPLN) waveguides are discussed.

Figure 8A:
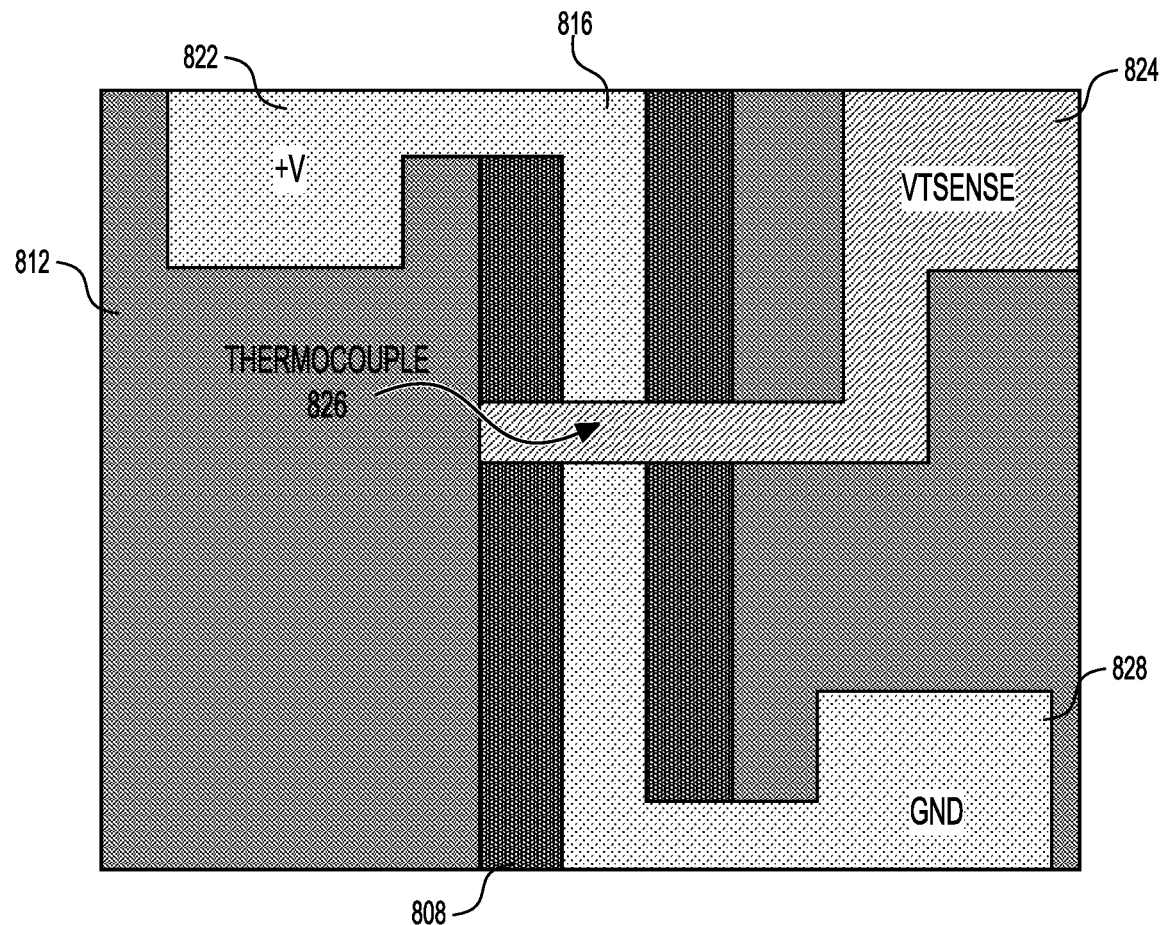
FIG. 8A illustrates a top view of a periodically poled lithium niobate (PPLN) waveguide with temperature monitoring, according to an example.

FIG. 8A illustrates a top view of a periodically poled lithium niobate (PPLN) waveguide with temperature monitoring, according to an example. Diagram 800A shows a periodically poled lithium niobate (PPLN) waveguide 808 formed between two portions of a silicon oxide ($SiO_2$) layer 812 and a microheater 816 located over the periodically poled lithium niobate (PPLN) waveguide 808. The microheater may be coupled to two terminals 822 and 828 to provide positive supply voltage and ground (or negative supply voltage). Additionally, a thermo-couple 826 may be placed over the microheater 816 and coupled to a voltage sense terminal 824 to detect a temperature of the microheater.

In some examples, temperature monitoring of the microheater 816 may be provided by implementing a thin-film thermo-couple structure (e.g., thermo-couple 826) across the NiCr heater including the NiCr as one of the metals. The dissimilar metal in the structure may be, for example, platinum. A temperature dependent voltage may then be generated providing information regarding the temperature of the microheater 816. In the configuration shown in diagram 800A, the temperature sense voltage may be measured from the thermo-couple 826 by isolating the positive supply voltage from the heater circuit and measuring VTsense relative to the ground (GND) terminal 828. In some examples, multiple temperature sensors may be implemented along a length of the waveguide for increased precision and localized temperature detection on the device.

Figure 8B:
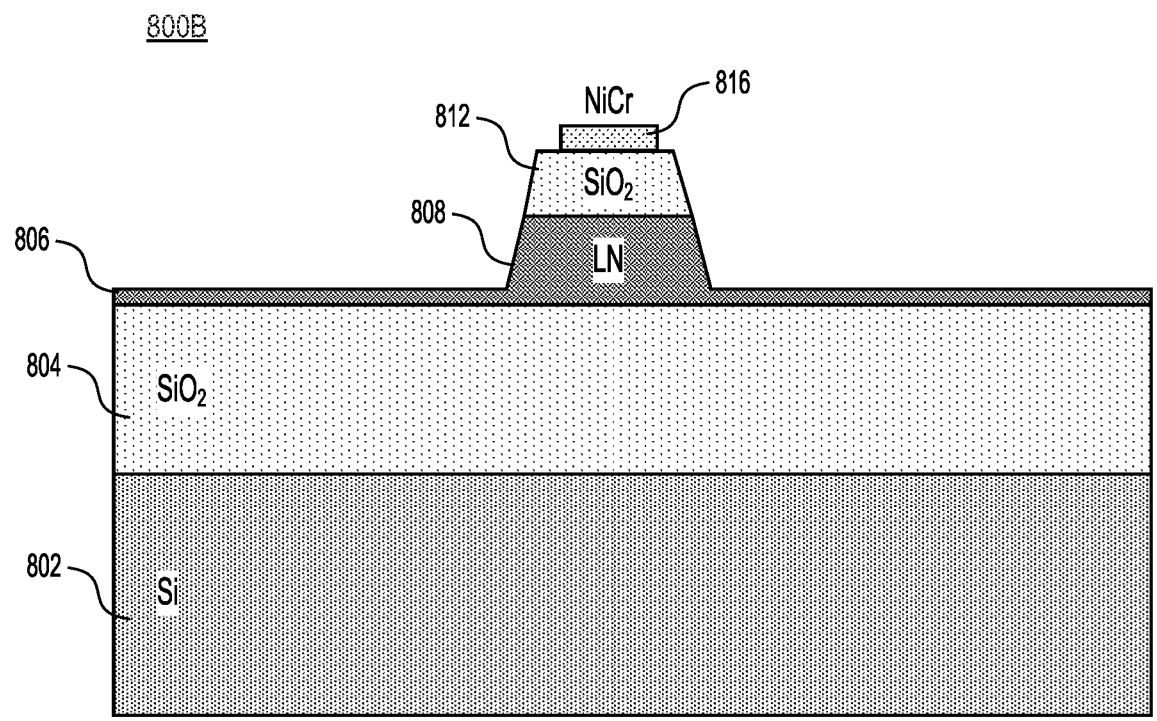
FIG. 8B illustrates a cross-sectional view of a periodically poled lithium niobate (PPLN) waveguide with a narrow heating element NiCr microheater and reduced top silicon oxide ($SiO_2$) layer, according to an example.

FIG. 8B illustrates a cross-sectional view of a periodically poled lithium niobate (PPLN) waveguide with a narrow heating element NiCr microheater and reduced top silicon oxide ($SiO_2$) layer, according to an example. Diagram 800B shows the periodically poled lithium niobate (PPLN) wave-guide 808 on a lithium niobate (LN) layer 806, which is on a silicon oxide ($SiO_2$) layer 804, which in turn is on a silicon (Si) layer 802. While examples are shown herein with the entire lithium niobate (LN) layer 806 and the waveguide covered by a top silicon oxide ($SiO_2$) layer (e.g., FIG. 4A, 6A), the illustrated example configuration includes a top silicon oxide ($SiO_2$) layer 812 only over the periodically poled lithium niobate (PPLN) waveguide 808. A NiCr microheater 816, which has a narrower width compared to the top silicon oxide ($SiO_2$) layer 812 is on the silicon oxide ($SiO_2$) layer 812.

In some examples, the NiCr microheater 816 may be implemented with a narrower width than the periodically poled lithium niobate (PPLN) waveguide 808 to concentrate heating on the waveguide. In other examples, a microheater that is wider than the waveguide may also be used. Also as shown in the diagram 800B, the top silicon oxide ($SiO_2$) layer 812 may be moved away from the waveguide such that only a top surface of the waveguide is covered. This configuration may further localize the heating. In addition, the reduced top silicon oxide ($SiO_2$) layer 812 may also introduce further flexibility to the waveguide design for group velocity dispersion (GVD) mismatch control by allowing for alternative cladding materials such as air.

Although silicon oxide ($SiO_2$) is used as example dielectric material for insulating the microheater and for waveguide cladding in the illustrated configurations herein, other dielectric materials that have a refractive index lower than lithium niobate (LN) may also be used such as silicon nitride or a silicon oxynitride or a photoresist such as SU-8.

Figure 9A:
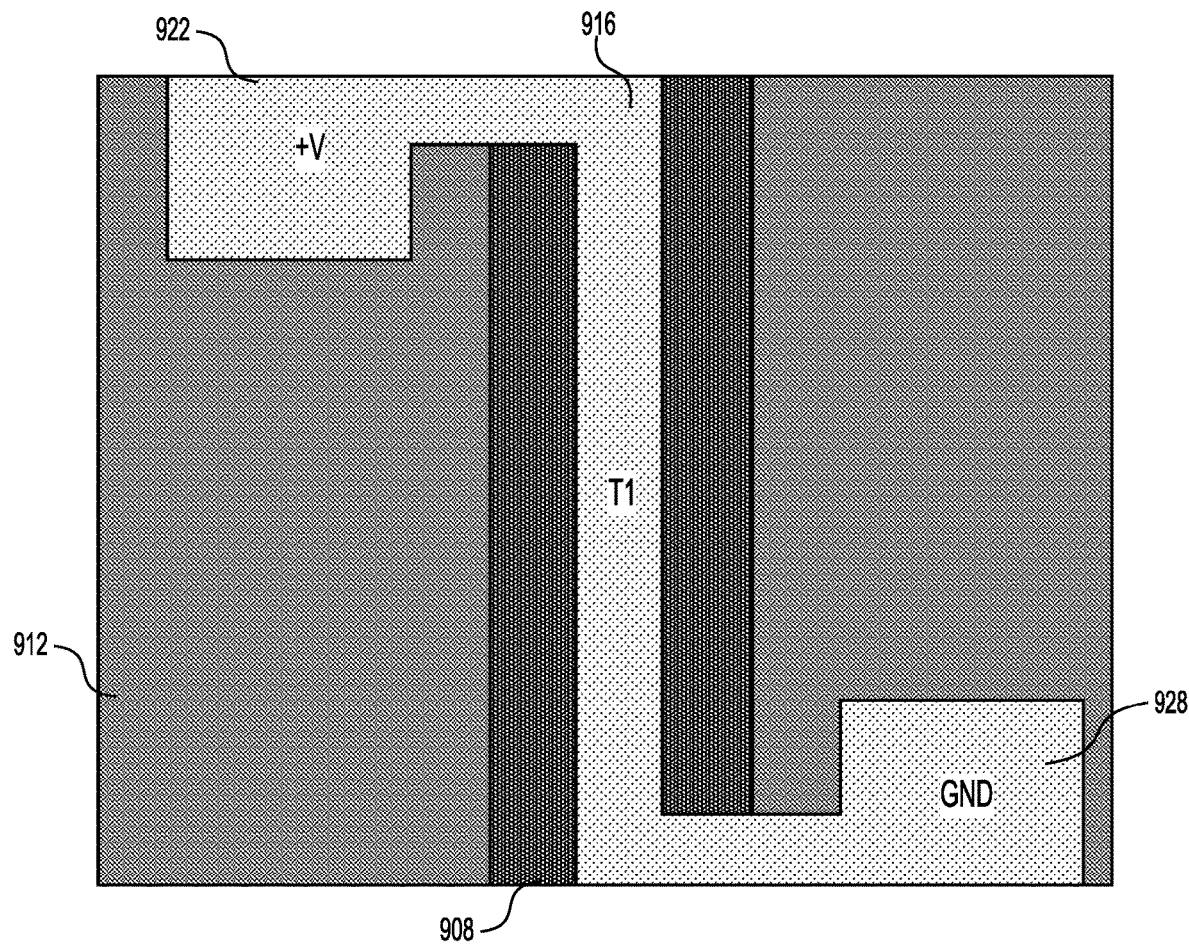
FIG. 9A-9B illustrate top views of a periodically poled lithium niobate (PPLN) waveguide with a combined cladding and heating element, according to an example.
Figure 9B:
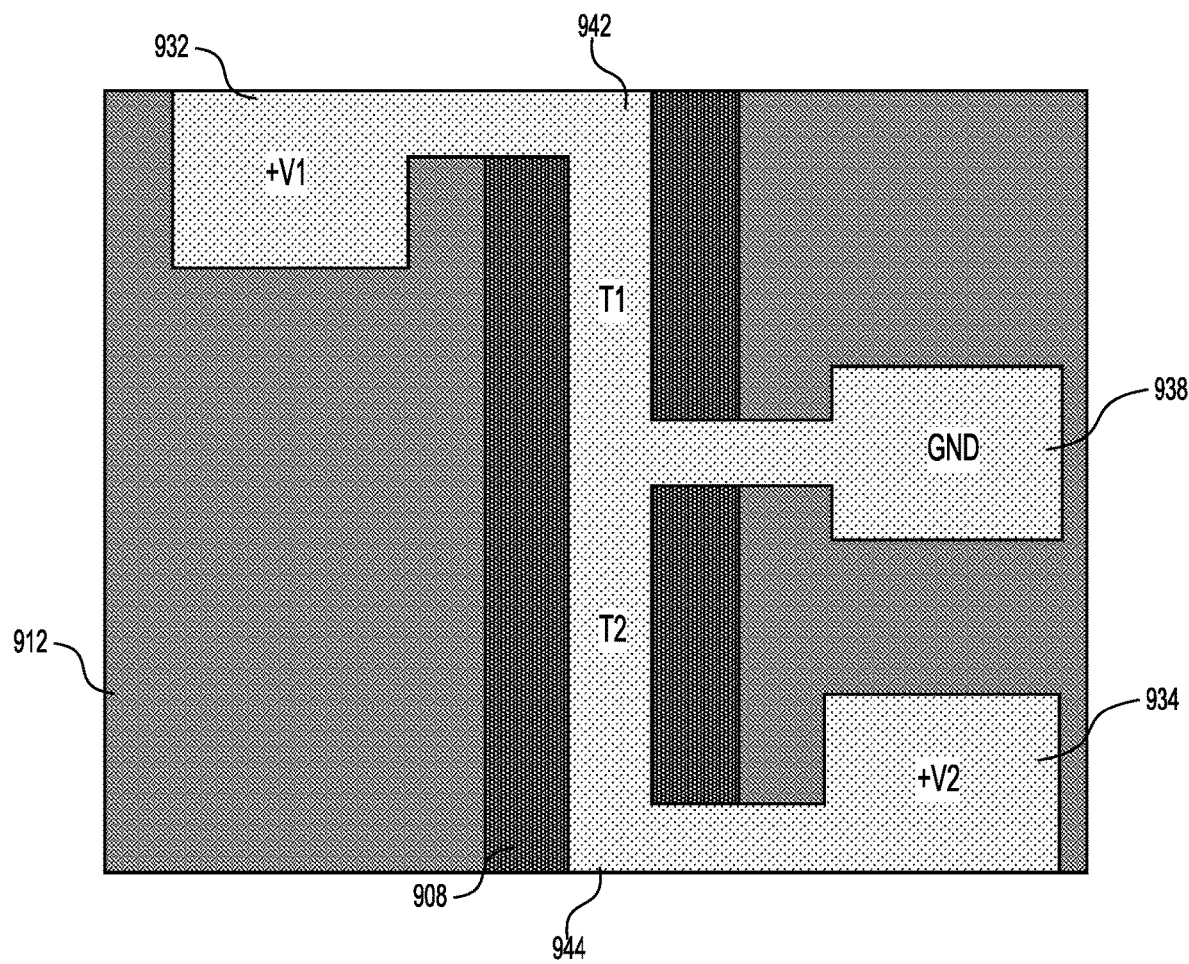

FIG. 9A-9B illustrate top views of a periodically poled lithium niobate (PPLN) waveguide with a combined cladding and heating element, according to an example. Diagram 900A in FIG. 9A shows a periodically poled lithium niobate (PPLN) waveguide 908 formed between two portions of a silicon oxide ($SiO_2$) layer 912 and a combined cladding and heating element layer 916 located over the periodically poled lithium niobate (PPLN) waveguide 908. The combined cladding and heating element layer 916 may be coupled to two terminals 922 and 928 to provide positive supply voltage and ground (or negative supply voltage).

In some examples, a combined cladding and heating element layer 916 may be utilized provided (1) cladding material is transparent and low loss to both fundamental and second harmonic generation (SHG) wavelengths; (2) cladding material has a lower refractive index than lithium niobate (LN) for both wavelengths; and (3) cladding material has a resistivity suitable for use as a heating element. Thus, the periodically poled lithium niobate (PPLN) waveguide may be heated directly without the high optical losses associated with an adjacent metal element. An example of such a cladding material may be Indium Tin Oxide (ITO), especially when deposited obliquely to reduce the effective refractive index, although other transparent conductive oxide (TCO) materials may also be suitable.

In some examples, a basic pair of contacts (terminals 922, 928) may be provided to the microheater to heat the waveguide to a common temperature T1. As shown in diagram 900B in FIG. 9B, alternative implementations may include a central GND contact (terminal 938), and two supply voltage contacts (terminals 932, 934) to apply different currents form +V1 and +V2 and hence heating the ends 942, 944 of the periodically poled lithium niobate (PPLN) waveguide 908 to different temperatures (T1 and T2). Thus, a temperature gradient may be imposed along a longitudinal dimension of the waveguide to emulate a variable chirped type periodically poled lithium niobate (PPLN) element for optimized phase-matching under different conditions.

Figure 9C:
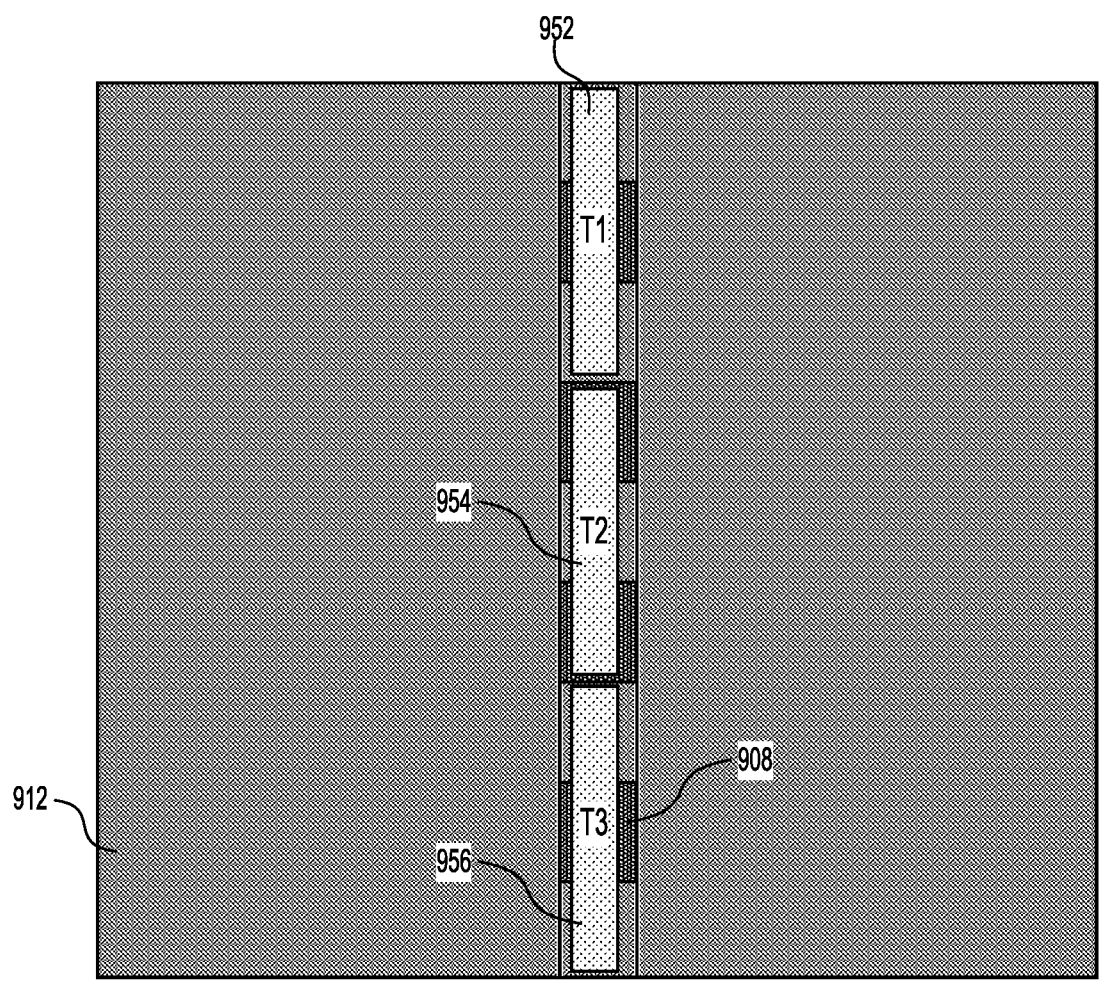
FIG. 9C illustrates a top view of a periodically poled lithium niobate (PPLN) waveguide with multiple heating elements, according to an example.

FIG. 9C illustrates a top view of a periodically poled lithium niobate (PPLN) waveguide with multiple heating elements, according to an example. As shown in diagram 900C, the combined cladding and heating element layer (or a standalone microheater) may be segmented into multiple elements 952, 954, 956, each heating a respective portion of the periodically poled lithium niobate (PPLN) waveguide independently to different temperatures to suit specific performance requirements.

While second harmonic generation (SHG) is discussed in conjunction with various example configurations herein for nonlinear generation of visible tunable light from tunable infrared laser light, in some examples, sum frequency generation (SFG) may be a preferred approach. In such scenarios, the input laser source may include multiple laser sources with one or more being tunable instead of a single tunable infrared laser source. Other structures and configurations described herein may remain unchanged. In some examples, a tunable infrared laser and a fixed wavelength infrared laser may be combined and coupled into the nonlinear waveguide to generate tunable visible light.

In a typical display system, red, green, and blue tunable visible light sources may be used. In some examples, three independent tunable infrared sources may be used to generate each color via second harmonic generation (SHG). Alternatively, one tunable infrared source may be split into three and then mixed with three separate fixed wavelength infrared lasers of different wavelengths before coupling into three separate nonlinear waveguides for sum frequency generation (SFG) to generate tunable red, green, and blue outputs.

The systems and methods described herein may also provide examples that combine electro-optic (EO) tuning and thermo-optic (TO) tuning of a periodically poled lithium niobate (PPLN) waveguide. As used herein, a waveguide may be any optical structure that propagates a variety of signals (e.g., optical signals, electromagnetic waves, sound waves, etc.) in one or more directions. Rapidly tunable generation of light through nonlinear frequency conversion, such as second-harmonic generation (SHG), sum-frequency generation (SFG), and/or difference-frequency generation (DFG) may be controlled electro-optically or thermo-optically as discussed herein. In some alternative examples, the electro-optic (EO) and thermo-optic (TO) processes may be combined for the tuning of a periodically poled lithium niobate (PPLN) waveguide.

Figure 10A:
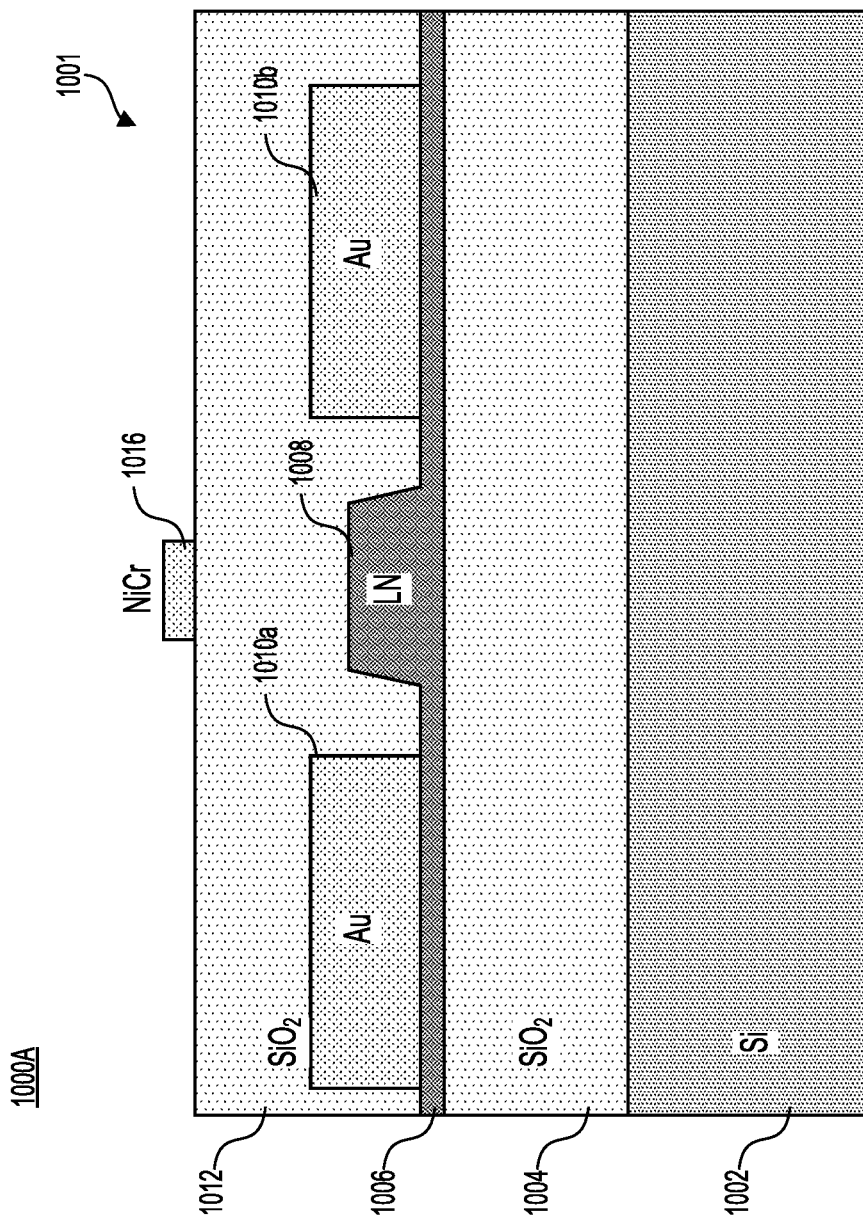
FIGS. 10A-10C illustrate views for combined electro-optic (EO)/thermo-optic (TO) tuning of a periodically poled lithium niobate (PPLN) waveguide, according to an example.
Figure 10B:
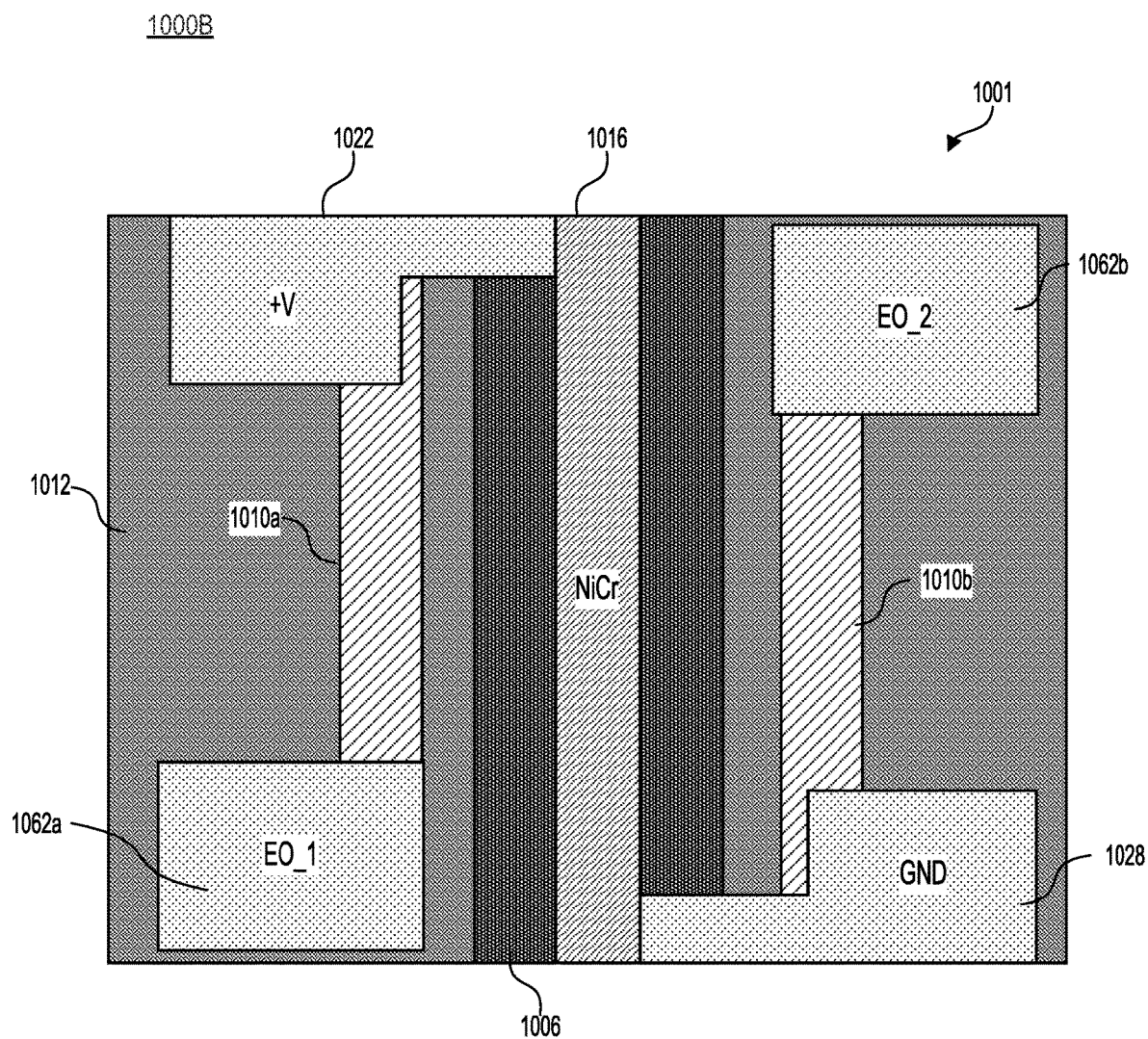
Figure 10C:
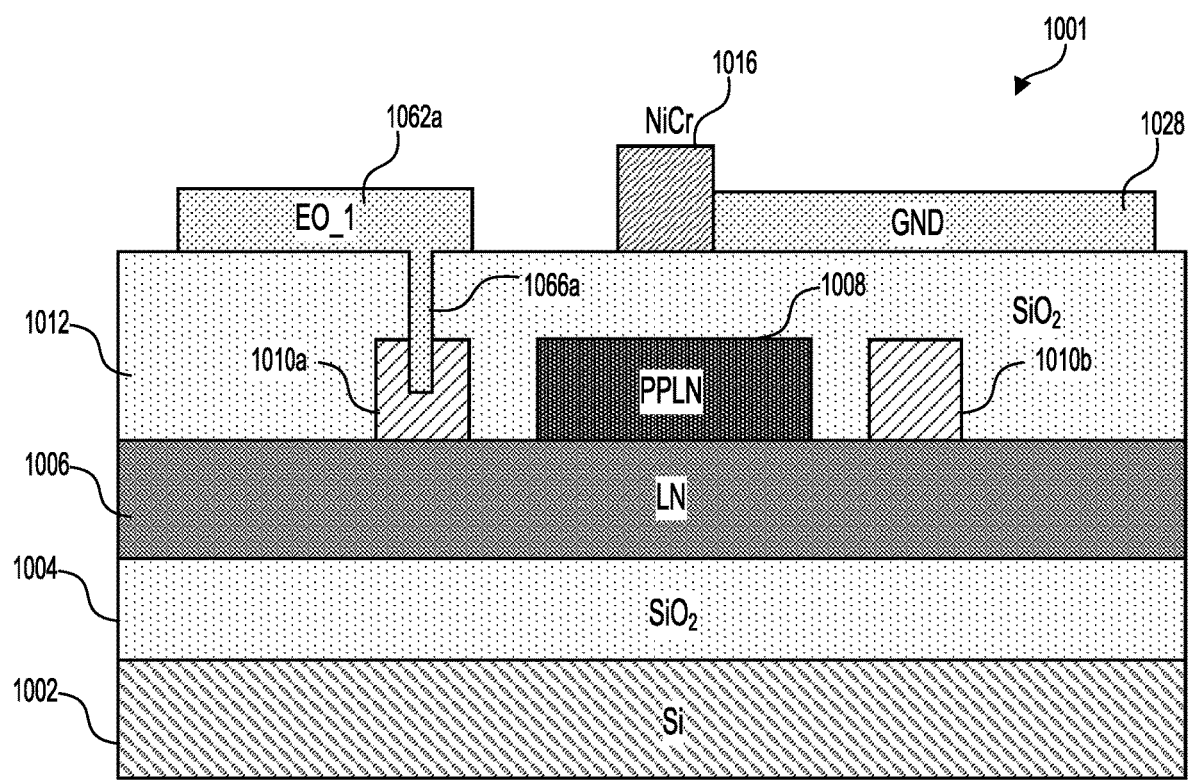

FIGS. 10A-10C illustrate views for combined electro-optic (EO)/thermo-optic (TO) tuning of a periodically poled lithium niobate (PPLN) waveguide, according to an example. Diagram 1000A in FIG. 10A shows a cross-sectional view of a periodically poled lithium niobate (PPLN) waveguide device 1001 that may be tuned through a combination of electro-optic (EO) and a thermo-optic (TO) process, according to an example. The periodically poled lithium niobate (PPLN) waveguide device 1001 may include a first layer 1002, a second layer 1004, and third layer 1006, and a fourth layer 1012. The first layer 1002 may be a lower silicon (Si) layer. The second layer 1004 may be a silicon oxide (SiO$_2$) layer. The third layer 1006 may be a lithium niobate (LN) layer. As shown, the LN layer may include the periodically poled lithium niobate (PPLN) waveguide 1008 formed as a protrusion on the LN layer that is periodically poled. Two electrodes 1010a and 1010b may be provided on the third layer 1006 to provide an electric field for the electro-optic (EO) tuning. The fourth layer 1012 may be an upper silicon oxide (SiO$_2$) layer (or cladding) deposited over the third layer 1006, electrodes 1010a, 1010b, and the periodically poled lithium niobate (PPLN) waveguide 1008. Microheater 1016 may be layered on the fourth layer 1012 and made from Nichrome (NiCr), an alloy of nickel and chromium or similar materials.

In some examples, the electro-optic (EO) tuning, applied using the two electrodes 1010a and 1010b, may allow rapid tuning. The thermo-optic (TO) tuning, applied using the NiCr microheater 1016, may allow slower tuning but over a wider wavelength range. In combination, the accessible tuning range may be large and fast compared to the tuning range and performance of individual tuning techniques.

Diagram 1000B in FIG. 10B shows a top view of a periodically poled lithium niobate (PPLN) waveguide device 1001 that may be tuned through a combination of electro-optic (EO) and a thermo-optic (TO) process, according to an example. As shown in diagram 1000B, a periodically poled lithium niobate (PPLN) waveguide 1008 may be formed between two portions of a silicon oxide (SiO$_2$) layer 1012 and a microheater 1016 located over the periodically poled lithium niobate (PPLN) waveguide 1008. The microheater may be coupled to two terminals 1022 and 1028 to provide positive supply voltage and ground (or negative supply voltage). Additionally, a pair of electro-optic (EO) control electrodes 1010a and 1010b may be buried inside the silicon oxide (SiO$_2$) layer 1012 alongside the periodically poled lithium niobate (PPLN) waveguide 1008. The electro-optic (EO) control electrodes 1010a and 1010b may be connected to a respective pair of electro-optic (EO) control terminals 1062a and 1062b.

In some examples, voltage may be applied to the electro-optic (EO) control terminals 1062a and 1062b causing the electro-optic (EO) control electrodes 1010a and 1010b to generate an electric field that affects the periodically poled lithium niobate (PPLN) waveguide 1008 and changes its refractive index providing rapid tuning for nonlinear frequency conversion. Application of a supply voltage to the terminals 1022 and 1028 may cause the microheater 1016 to generate heat toward the periodically poled lithium niobate (PPLN) waveguide 1008 and further tune its performance at a comparatively slower rate, but over a wider wavelength range.

Diagram 1000C in FIG. 10C shows a front cross-sectional view of a periodically poled lithium niobate (PPLN) waveguide device 1001 that may be tuned through a combination of electro-optic (EO) and a thermo-optic (TO) process, according to an example. The periodically poled lithium niobate (PPLN) waveguide device 1001 may include a first layer 1002, a second layer 1004, and third layer 1006, and a fourth layer 1012. The first layer 1002 may be a lower silicon (Si) layer. The second layer 1004 may be a silicon oxide (SiO$_2$) layer. The third layer 1006 may be a lithium niobate (LN) layer. As shown, the LN layer may include the periodically poled lithium niobate (PPLN) waveguide 1008 formed as a protrusion on the LN layer that is periodically poled. Two electro-optic (EO) control electrodes 1010a and 1010b may be positioned in the fourth layer 1012 alongside the periodically poled lithium niobate (PPLN) waveguide 1008 and provide the electric field for the electro-optic (EO) tuning.

Diagram 1000C also shows microheater 1016 on the fourth layer 102, positioned over the periodically poled lithium niobate (PPLN) waveguide 1008 to provide heat for the thermo-optic (TO) tuning of the periodically poled lithium niobate (PPLN) waveguide 1008. One of the supply terminals (GND terminal 1028) for the microheater 1016 is shown. Also, one of the electro-optic (EO) control terminals 1062a to provide voltage to the electro-optic (EO) control electrode 1010a is shown. The electro-optic (EO) control electrode 1010a may be connected to the electro-optic (EO) control terminal 1062a through an etched vertical via in some examples.

In some examples, exploitation of particular linear and nonlinear optical properties of lithium niobate (LN) for nonlinear frequency conversion may be controlled through acousto-optic (AO) techniques. For example, Acousto-optic (AO) tunable second harmonic generation (SHG) may be implemented in periodically poled lithium niobate (PPLN) waveguides. The acoustic wave may either be induced from an external transducer or self-generated in the periodically poled lithium niobate (PPLN) through a cross-field radio frequency field.

Figure 11:
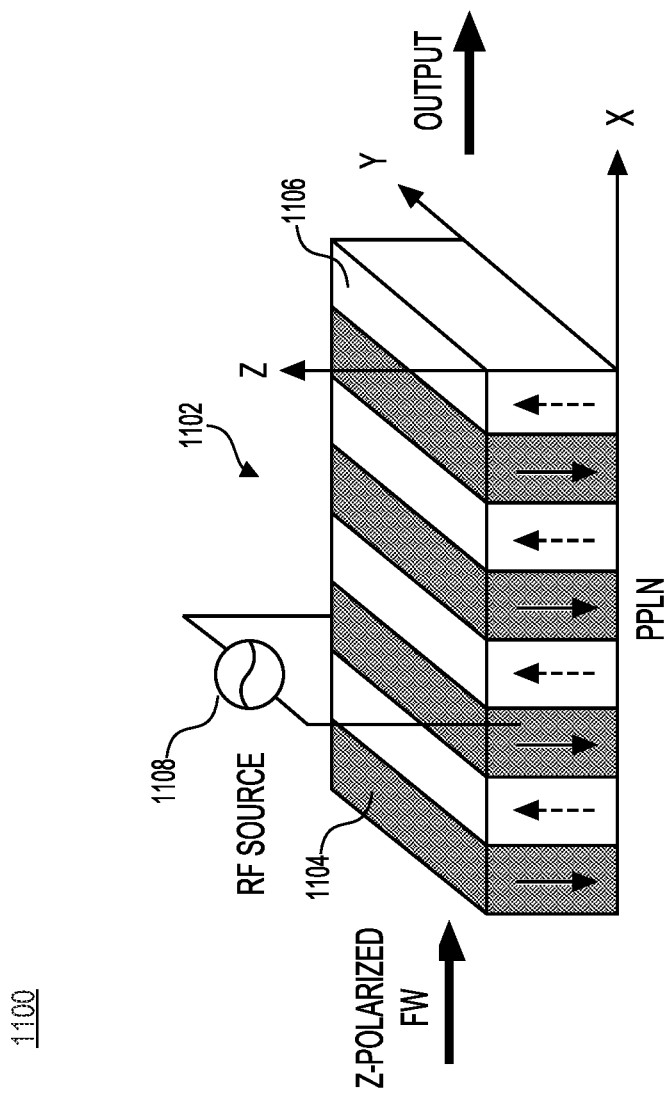
FIG. 11 illustrates a diagram of acousto-optic (AO) tuning of a periodically poled lithium niobate (PPLN) waveguide, according to an example.

FIG. 11 illustrates a diagram of acousto-optic (AO) tuning of a periodically poled lithium niobate (PPLN) waveguide, according to an example. Diagram 1100 is a schematic diagram of an integrated periodically poled lithium niobate (PPLN) acousto-optic (AO) tunable frequency doubler 1102 with cross-field radio frequency (RF) driving, the RF source 1108 provides the cross-field RF driving signal, which may be applied at Y-side surfaces to excite a longitudinal wave along X-axis. Flipped (or poled) portions of the periodically poled lithium niobate (PPLN) are indicated by reference numerals 1104 and 1106.

In some examples, an acoustic wave may affect a wave vector matching between fundamental wave (FW) and its second harmonic (SH). Thus, frequency doubling may be tunable by an externally induced acoustic wave. Furthermore, a periodically poled lithium niobate (PPLN) itself may act as an acoustic superlattice to generate a high-frequency bulk acoustic wave. Therefore, a radio frequency (RF) signal may be used to manipulate the second harmonic generation (SHG) directly though cascaded piezoelectric and acousto-optic (AO) processes in a periodically poled lithium niobate (PPLN).

When an acoustic wave travels in a periodically poled lithium niobate (PPLN), it may result in deformation so that the domain boundaries may be displaced periodically. In addition, the refractive index may also change due to the elasto-optic effect. As the elasto-optic coefficient is a fourth-rank tensor, it may remain uniform in both positive and negative domain. The acoustic wave may travel as in a single-domain lithium niobate (LN) crystal, and a periodic index modulation may be built up in the periodically poled lithium niobate (PPLN), which may affect its optical properties. From a quantum point of view, the phonons may scatter photons strongly if the corresponding momentum (wave vector) conservation is satisfied. As the periodically poled lithium niobate (PPLN) is a one-dimensional microstructure, the collinear-phonons may scatter the photons toward the backward direction, i.e., Bragg scattering, or, forward scattering with orthogonal polarization. As the backward scattering requires extremely high acoustic frequency, the acousto-optic polarization rotation may be practical. In forward scattering with orthogonal polarization, a wave vector difference may depend on a crystal's birefringence, which is relatively much lower than that of backward Bragg scattering. This polarization rotation effect may be realized for either fundamental waves (FWs) or second harmonics (SHs) depending on the phonon's frequency.

In some examples, a generated peak acoustic frequency may be represented by the following expression/equation $f=v/\Lambda$, where v is acoustic velocity and $\Lambda$ is the periodically poled lithium niobate (PPLN) period (i.e., a width of the poled portions). When the phase-matching condition is satisfied for both the acousto-optic (AO) polarization coupling and the quasi-phase-matching (QPM) frequency doubling simultaneously, the two processes may be coupled together. The phase-matching conditions may be difficult to satisfy, requiring tight constrains on working temperature, wavelength, and/or superlattice geometrical parameters. For example, at room temperature 20° C., a 4.95 μm period PPLN may be selected for a 961 nm fundamental wave (FW). The corresponding acoustic frequency may be $f=v/\Lambda=1.33$ GHz. To realize this approach at other wavelengths, temperature tuning may be employed. In other examples, employing third-order or high order quasi-phase-matching (QPM) may further relax these constrains and ease fabrication challenges.

In some examples, a reciprocal vector of periodically poled lithium niobate (PPLN) may compensate a second harmonic generation (SHG) wave-vector mismatch when quasi-phase-matching (QPM) condition is satisfied, while phonons with suitable frequencies may affect it by scattering photons to different polarization state. Thus, second harmonic waves' intensities, polarization states, and/or phases may be manipulated instantly through acousto-optic (AO) interaction.

Tunable light sources through various techniques such as electro-optic (EO), thermo-optic (TO), acousto-optic (AO), and combinations thereof, controlled periodically poled lithium niobate (PPLN) waveguides are disclosed herein in conjunction with virtual reality (VR), augmented reality (AR), and/or mixed reality (MR) based display systems. Example tunable light sources and techniques may, however, be used with any type, shape, or form of display device, as well as, in color analysis systems, reflectivity measurement systems, and comparable ones.

Herein disclosed electro-optic (EO), thermo-optic (TO), and acousto-optic (AO) control systems and periodically poled lithium niobate (PPLN) waveguides or similar structures may be fabricated using suitable techniques for each specific configuration and materials.

In some examples, lithium niobate (LN) passive device fabrication (e.g., waveguide) may include definition of a pattern by the electron-beam (e-beam) lithography (EBL) with a spin-coated e-beam resist, such as flowable oxide (FOx). An etching technique, such as inductively coupled plasma (ICP) reactive ion etching (RIE) process with Ar+ plasma, may be utilized to etch the lithium niobate (LN) with the FOx as the hard mask. FOx may be selected due to its high resolution and good etching selectivity. For the cladding, $SiO_2$ may be deposited as the cladding layer using plasma-enhanced chemical-vapor-deposition (PECVD), which may provide a conformal layer deposition.

A thermo-optic device (e.g., the microheater and the contact pads) may be fabricated by defining nichrome (NiCr) microheater patterns using EBL with poly(methyl methacrylate) (PMMA) e-beam resist and depositing using e-beam evaporation followed by a lift-off process. The gold (Au) contact pads may be fabricated by the same sequence except deposition by sputtering. An electro-optic device (e.g., electrodes) may be fabricated by defining gold (Au) electrode patterns using EBL with poly(methyl methacrylate) (PMMA) e-beam resist and depositing using e-beam evaporation, followed by a lift-off process.

In a practical implementation example, the devices may be fabricated on a LNOI wafer with 610 nm thick Z-cut LN thin film on 1.8 mm silicon dioxide ($SiO_2$) on a silicon substrate. The bus waveguide may be tapered to a width of 4 mm at both facets to improve the fiber-to-chip coupling efficiency. The pattern may be defined by a 100 kV electron beam lithography system with a negative FOx-16 resist. The exposed pattern may be transferred onto the LN thin film using an optimized inductively couple plasma (ICP) reactive ion etching (RIE) process with Ar+ plasma.

For the subsequent poling process, the concentric nickel electrodes may be initially patterned on top of the LN microring via the lift-off process. The periodic domain inversion may then be enabled by keeping the silicon substrate as the electrical ground while applying two 600 V, 250 ms pulses on the electrodes at an elevated temperature of 250 deg C. After removing the nickel electrodes, the chip may be cleaved to expose the waveguide facets for fiber-to-chip coupling. The insertion losses may be calibrated to be 8.4 and 11.1 dB/facet for the infrared and near-visible lights, respectively.

According to examples, a thermo-optically (TO) controlled, wavelength tunable light source may include a first layer comprising a substrate material; a second layer provided on the first layer, the second layer including a cladding layer; and a third layer provided on the second layer, the third layer including lithium niobate (LN), where a portion of the third layer forms a protrusion along one dimension of the third layer, and where the protrusion is a periodically poled lithium niobate (PPLN) waveguide. The tunable light source may also include a fourth layer provided on the third layer, the fourth layer including silicon dioxide ($SiO_2$) and covering at least partially the third layer and the PPLN waveguide; and at least one microheater provided on the fourth layer. The microheater may generate heat in response to an applied current to cause a change in a refractive index of the PPLN waveguide via the generated heat; and adjust an output wavelength of the PPLN waveguide in response to a varied input signal wavelength through the change in the refractive index of the PPLN waveguide.

According to examples, the substrate material may include silicon (Si) or similar materials and the cladding layer may include silicon dioxide ($SiO_2$) or similar materials. The at least one microheater may include a plurality of microheaters in substantially similar size to generate distinct temperatures at distinct portions of the PPLN waveguide. The substrate material may include silicon (Si) and the cladding layer may include silicon dioxide ($SiO_2$). The microheater may respond to a plurality of currents to generate a temperature gradient along a longitudinal dimension of the PPLN waveguide. The microheater may include a metal or a metal alloy suitable for imposing ohmic heating. The metal alloy may include one or more of a nickel chromium alloy, a constantan alloy, or a manganin alloy. The microheater may be formed as at least a portion of the fourth layer. The portion of the fourth layer acting as the microheater may include a transparent conductive oxide. The transparent conductive oxide may include Indium Tin Oxide (ITO), Aluminum Zinc Oxide (AZO). The waveguide tunable light source may further include a thermo-coupling element provided on the microheater to detect a temperature change caused by the microheater.

According to examples, an electro-optically (EO) controlled tunable light source may include a first layer including a substrate material; a second layer provided on the first layer, the second layer including a cladding layer; a third layer provided on the second layer, the third layer including lithium niobate (LN), where a central portion of the third layer forms a protrusion along one dimension of the third layer, and where the protrusion is a periodically poled lithium niobate (PPLN) waveguide; and a fourth layer provided on the third layer, the fourth layer including silicon dioxide ($SiO_2$) and covering at least partially the third layer and the PPLN waveguide. The tunable light source may further include at least two electrodes provided on the fourth layer. The electrodes may generate an electric field in response to an applied voltage to cause a change in a refractive index of the PPLN waveguide via the generated electric field; and adjust an output wavelength of the PPLN waveguide in response to a varied input signal wavelength through the change in the refractive index of the PPLN waveguide.

According to examples, the output wavelength of the PPLN waveguide may be adjusted in response to the varied input signal wavelength through maximum nonlinear frequency conversion. The nonlinear frequency conversion may be used in at least one of a second harmonic generation (SHG), a sum frequency generation (SFG), or a difference frequency generation (DFG) technique. The input signal may be an infrared laser. The tunable light source may be part of a photonic integrated circuit (PIC). At least a portion of the fourth layer may be removed to provide air cladding.

According to examples, a tunable light source may include a periodically poled lithium niobate (PPLN) waveguide; a control mechanism to control an output wavelength of the PPLN waveguide in response to an input signal with a varied wavelength through maximum nonlinear frequency conversion, where the control mechanism comprises one or more of an electro-optic (EO) tuning mechanism, a microheater-based thermo-optic (TO) control mechanism, or an acousto-optic (AO) control mechanism; and an infrared laser source to provide the input signal to the PPLN waveguide.

According to examples, the acousto-optic (AO) control mechanism may include a radio frequency (RF) source to provide a cross-field RF driving signal to excite a longitudinal acoustic wave along an X-axis of the PPLN waveguide; cause a change in a refractive index of the PPLN waveguide via the excited acoustic wave; and adjust the output wavelength of the PPLN waveguide in response to the input signal through the change in the refractive index of the PPLN waveguide.

According to examples, the control mechanism may include the electro-optic (EO) tuning mechanism and the microheater-based thermo-optic (TO) control mechanism. The electro-optic (EO) control mechanism may include at least two electrodes provided on a top layer of the PPLN waveguide to generate an electric field in response to an applied voltage; cause a change in a refractive index of the PPLN waveguide via the generated electric field; and adjust an output wavelength of the PPLN waveguide through the change in the refractive index of the PPLN waveguide. The thermo-optic (TO) control mechanism may include at least one microheater provided on the top layer of the PPLN waveguide to generate heat in response to a provided current; cause the change in the refractive index of the PPLN waveguide via the generated heat; and adjust the output wavelength of the PPLN waveguide through the change in the refractive index of the PPLN waveguide. The tunable light source may be part of a photonic integrated circuit (PIC). The tunable light source may be part of a head-mounted display (HMD) device for at least one of a virtual reality (VR), an augmented reality (AR), or a mixed reality (MR) application.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A wavelength tunable light source, comprising:
a first layer comprising a substrate material;
a second layer provided on the first layer, the second layer comprising a cladding layer;
a third layer provided on the second layer, the third layer comprising lithium niobate (LN), wherein a portion of the third layer forms a protrusion along one dimension of the third layer, and wherein the protrusion is a periodically poled lithium niobate (PPLN) waveguide;
a fourth layer provided on the third layer, the fourth layer comprising silicon dioxide (SiO2) and covering at least partially the third layer and the PPLN waveguide; and
at least one microheater provided on the fourth layer to:
generate heat in response to an applied current to cause a change in a refractive index of the PPLN waveguide via the generated heat; and
adjust an output wavelength of the PPLN waveguide in response to a varied input signal wavelength through the change in the refractive index of the PPLN waveguide.

2. The wavelength tunable light source of claim 1, wherein the at least one microheater comprises a plurality of microheaters in substantially similar size to generate distinct temperatures at distinct portions of the PPLN waveguide.

3. The wavelength tunable light source of claim 1, wherein the substrate material comprises silicon (Si) and the cladding layer comprises silicon dioxide (SiO2).

4. The wavelength tunable light source of claim 1, wherein the microheater responds to a plurality of currents to generate a temperature gradient along a longitudinal dimension of the PPLN waveguide.

5. The wavelength tunable light source of claim 1, wherein the microheater comprises a metal or a metal alloy suitable for imposing ohmic heating.

6. The wavelength tunable light source of claim 1, wherein the microheater is formed as at least a portion of the fourth layer.

7. The wavelength tunable light source of claim 6, wherein the at least portion of the fourth layer acting as the microheater comprises a transparent conductive oxide.

8. The wavelength tunable light source of claim 1, further comprising:
a thermo-coupling element provided on the microheater to detect a temperature change caused by the microheater.

9. A tunable light source, comprising:
a first layer comprising a substrate material;
a second layer provided on the first layer, the second layer comprising a cladding layer;
a third layer provided on the second layer, the third layer comprising lithium niobate (LN), wherein a central portion of the third layer forms a protrusion along one dimension of the third layer, and wherein the protrusion is a periodically poled lithium niobate (PPLN) waveguide;
a fourth layer provided on the third layer, the fourth layer comprising silicon dioxide (SiO2) and covering at least partially the third layer and the PPLN waveguide; and
at least two electrodes provided on the fourth layer to:
generate an electric field in response to an applied voltage to cause a change in a refractive index of the PPLN waveguide via the generated electric field; and
adjust an output wavelength of the PPLN waveguide in response to a varied input signal wavelength through the change in the refractive index of the PPLN waveguide.

10. The tunable light source of claim 9, wherein the output wavelength of the PPLN waveguide is adjusted in response to the varied input signal wavelength through a nonlinear frequency conversion.

11. The tunable light source of claim 10, wherein the nonlinear frequency conversion is used in at least one of a second harmonic generation (SHG), a sum frequency generation (SFG), or a difference frequency generation (DFG) technique.

12. The tunable light source of claim 9, wherein the varied input signal wavelength is an infrared laser.

13. The tunable light source of claim 9, wherein the tunable light source is part of a photonic integrated circuit (PIC).

14. The tunable light source of claim 9, wherein at least a portion of the fourth layer is removed to provide air cladding.

15. A tunable light source, comprising:
a device comprising a plurality of layers including a lithium niobate (LN) layer, a portion of the LN layer protruding along one dimension of the LN layer to form an LN protrusion, wherein the LN protrusion is to be periodically poled to form a periodically poled lithium niobate (PPLN) waveguide;
a control mechanism to control an output wavelength of the PPLN waveguide in response to an input signal with a varied wavelength through a nonlinear frequency conversion; and
an infrared laser source to provide the input signal to the PPLN waveguide.

16. The tunable light source of claim 15, wherein the control mechanism is an acousto-optic (AO) control mechanism that comprises a radio frequency (RF) source to:
provide a cross-field RF driving signal to excite a longitudinal acoustic wave along an X-axis of the PPLN waveguide;
cause a change in a refractive index of the PPLN waveguide via the excited acoustic wave; and adjust the output wavelength of the PPLN waveguide in response to the input signal through the change in the refractive index of the PPLN waveguide.

17. The tunable light source of claim 15, wherein the control mechanism comprises an electro-optic (EO) tuning mechanism and a microheater-based thermo-optic (TO) control mechanism.

18. The tunable light source of claim 17, wherein the electro-optic (EO) control mechanism comprises at least two electrodes provided on a top layer of the PPLN waveguide to:
   generate an electric field in response to an applied voltage;
   cause a change in a refractive index of the PPLN waveguide via the generated electric field; and
   adjust an output wavelength of the PPLN waveguide through the change in the refractive index of the PPLN waveguide; and the microheater-based thermo-optic (TO) control mechanism comprises at least one microheater provided on the top layer of the PPLN waveguide to:
   generate heat in response to a provided current;
   cause the change in the refractive index of the PPLN waveguide via the generated heat; and
   adjust the output wavelength of the PPLN waveguide through the change in the refractive index of the PPLN waveguide.

19. The tunable light source of claim 15, wherein the tunable light source is part of a photonic integrated circuit (PIC).

20. The tunable light source of claim 15, wherein the tunable light source is part of a head-mounted display (HMD) device for at least one of a virtual reality (VR), an augmented reality (AR), or a mixed reality (MR) application.

\* \* \* \* \*